(12) United States Patent
Suda

(10) Patent No.: US 7,414,664 B2
(45) Date of Patent: Aug. 19, 2008

(54) IMAGE TAKING APPARATUS AND LENS APPARATUS

(75) Inventor: Yasuo Suda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 686 days.

(21) Appl. No.: 10/770,437

(22) Filed: Feb. 4, 2004

(65) Prior Publication Data
US 2004/0155976 A1     Aug. 12, 2004

(30) Foreign Application Priority Data
Feb. 12, 2003  (JP)  ............................. 2003-033269
Jan. 29, 2004  (JP)  ............................. 2004-022035

(51) Int. Cl.
H04N 5/225    (2006.01)
G03B 7/099    (2006.01)
G03B 19/12    (2006.01)
G03B 13/00    (2006.01)
G02B 7/28     (2006.01)

(52) U.S. Cl. ................... 348/341; 348/333.09; 348/344; 348/374; 396/272; 396/358; 396/111

(58) Field of Classification Search ................. 348/345, 348/208.12, 340, 333.09, 344, 357, 341, 348/333.01–333.1; 396/358, 355, 112, 113; 354/402, 404, 405
See application file for complete search history.

(56) References Cited

U.S. PATENT DOCUMENTS

| | | | |
|---|---|---|---|
| 4,110,765 A | 8/1978 | Miyata et al. ................. 354/59 |
| 4,307,947 A | 12/1981 | Jyoujiki ........................ 354/25 |
| 4,557,580 A | 12/1985 | Suzuki ........................ 354/406 |
| 4,673,278 A | 6/1987 | Fukuda et al. ............... 354/479 |
| 4,698,492 A | 10/1987 | Ohtaka et al. ................ 250/201 |
| 4,704,022 A | 11/1987 | Nozawa et al. .............. 354/219 |
| 4,777,506 A | 10/1988 | Hiramatsu et al. .......... 354/408 |
| 4,914,282 A | 4/1990 | Akashi et al. ............. 250/201.8 |

(Continued)

FOREIGN PATENT DOCUMENTS

JP         3-068282 A      3/1991

(Continued)

OTHER PUBLICATIONS

Patent Abstracts of Japan, vol. 0152, No. 33, E-1077, Jun. 14, 1991 (JP 3-068282 A, Mar. 25, 1991).

*Primary Examiner*—Ngoc-Yen T. Vu
*Assistant Examiner*—Christopher K Peterson
(74) *Attorney, Agent, or Firm*—Fitzpatrick, Cella, Harper & Scinto

(57) ABSTRACT

An image taking apparatus performs a focusing operation quickly and includes a light splitting unit which splits a light flux from an image-taking lens into a plurality of light fluxes, a view finder optical system observing an object image formed by the light flux from the lens, an image pickup element which photoelectrically converts the object image to an electrical signal and a focus detector detecting the focusing state of the lens according to a phase difference detector. Here, the light splitting unit changes between a first state for directing the light flux to the view finder optical system and the focus detector, a second state for directing the light flux to the image pickup element and the focus detector, and a third state in which the light flux is directed only to the image pickup element.

11 Claims, 12 Drawing Sheets

U.S. PATENT DOCUMENTS

| | | | |
|---|---|---|---|
| 4,941,010 A | 7/1990 | Aihara et al. | 354/407 |
| 5,053,803 A | 10/1991 | Suda et al. | 354/466 |
| 5,182,443 A | 1/1993 | Suda et al. | 250/201.2 |
| 5,212,514 A | 5/1993 | Goto | 354/402 |
| 5,489,965 A * | 2/1996 | Mukai et al. | 396/296 |
| 5,600,371 A * | 2/1997 | Arai et al. | 348/335 |
| 5,734,428 A | 3/1998 | Suda et al. | 348/341 |
| 5,737,648 A * | 4/1998 | Ejima et al. | 396/276 |
| 5,980,122 A | 11/1999 | Higashihara et al. | 396/354 |
| 6,047,139 A | 4/2000 | Suda | 396/296 |
| 6,112,029 A | 8/2000 | Suda | 396/92 |
| 6,183,142 B1 * | 2/2001 | Sakamoto et al. | 396/358 |
| 6,227,726 B1 | 5/2001 | Higuchi | 396/358 |
| 6,546,207 B2 * | 4/2003 | Wakui | 396/298 |
| 6,683,652 B1 * | 1/2004 | Ohkawara et al. | 348/347 |
| 6,992,720 B2 * | 1/2006 | Kaneda | 348/363 |
| 2001/0005231 A1 | 6/2001 | Kubo | 348/341 |
| 2001/0026683 A1 * | 10/2001 | Morimoto et al. | 396/89 |
| 2001/0055488 A1 | 12/2001 | Shono | 396/429 |
| 2002/0075394 A1 * | 6/2002 | Fuchimukai | 348/335 |
| 2002/0154228 A1 | 10/2002 | Matsumura | 348/240.2 |
| 2003/0044174 A1 * | 3/2003 | Endo | 396/55 |

FOREIGN PATENT DOCUMENTS

| | | |
|---|---|---|
| JP | 2000-162494 | 6/2000 |
| JP | 2001-125173 | 5/2001 |
| JP | 2001-215406 | 8/2001 |
| JP | 2001-275033 | 10/2001 |

\* cited by examiner

IMAGE TAKING APPARATUS AND LENS APPARATUS

BACKGROUND OF THE INVENTION

1. Field of the Invention

The present invention relates to an image taking apparatus having the function of focusing an objective lens and the function of observing an object image formed by the objective lens and a lens apparatus mounted on the image taking apparatus.

2. Description of the Related Art

When an object is observed through an optical view finder (OVF) of a single-lens reflex camera, which is one of optical apparatuses, a light flux emitted from the objective lens is reflected by a reflecting mirror provided on an optical path behind the objective lens (image plane side) to change its optical path and introduced into an optical view finder including a pentaprism, etc. This makes it possible to see an object image formed by the light flux which has passed through the objective lens as a normal image. At this time, the reflecting mirror is placed diagonally on the image-taking optical path.

On the other hand, when the objective lens is used as an image-taking lens (when an image is taken), the reflecting mirror is instantaneously withdrawn from the image-taking optical path and an image-taking light flux which has passed through the objective lens is formed on an image pickup medium (film and an image pickup element such as CCD). Then, when the image-taking operation is completed, the reflecting mirror is instantaneously placed diagonally on the image-taking optical path.

In a digital camera, in response to a release button depressing operation, an object image is exposed to light for a desired time on an image pickup element such as a CCD or CMOS sensor and an image signal expressing one still image obtained through photoelectrical conversion of the image pickup element is converted to a digital signal. Then, by applying predetermined processing such as YC processing to the converted digital signal, an image signal of a predetermined format is obtained.

The digital image signal expressing the picked up image is recorded in a semiconductor memory for each image. The recorded image signal is read out from the memory and displayed on a display unit of the camera, reproduced as a printable signal or output to and displayed on a display device, etc.

One type of the above described camera is a single-lens reflex type digital camera which allows manual selection of a focusing operation according to a phase difference detection system or focusing operation according to a contrast detection system as disclosed, for example, in Japanese Patent Application Laid-Open No. 2001-275033 (hereinafter referred to as "Document 1").

Furthermore, in a single-lens reflex type digital camera provided with an optical view finder and electric view finder (EVF) as disclosed, for example, in Japanese Patent Application Laid-Open No. 2001-125173 (hereinafter referred to as "Document 2"), when the reflecting mirror is placed diagonally on the image-taking optical path, focus detection according to a phase difference detection system is performed based on the light flux reflected by the reflecting mirror and when the reflecting mirror is withdrawn from the image-taking optical path, focus detection according to a contrast detection system is performed using the output of an image pickup element which receives the image-taking light flux.

In the camera disclosed in above Document 2, it is possible to electronically display the image which has been taken while performing focusing based on the output of the image pickup element even when the reflecting mirror is in a position withdrawn from the image-taking optical path. Therefore, the photographer can take images while checking the focusing state of the image which is electronically displayed on, for example, an organic EL display.

On the other hand, in focusing control, to increase the speed of deciding the focusing direction (driving direction of image-taking lens), there is a focusing apparatus provided with a step in a light detecting surface of the image pickup element as disclosed, for example, in Japanese Patent Application Laid-Open No. 2001-215406 (hereinafter referred to as "Document 3). That is, the optical path length is differentiated by a micro distance, a plurality of image signals are collected and the focusing direction is decided based on the collected image signal. Then, the image-taking lens is moved to the in-focus position in the decided focusing direction.

Furthermore, as disclosed, for example, in Japanese Patent Application Laid-Open No. 2000-162494 (hereinafter referred to as "Document 4), there is a camera system provided with a focus detection unit according to a phase difference detection system in each of a lens apparatus and a camera body. The method of detecting a focusing state according to a phase difference detection system is disclosed, for example, in Patent Publication No. H5(1993)-88445 (hereinafter referred to as "Document 5").

The camera disclosed in above described Documents 1 and 2 performs focusing according to the contrast detection system, but this detection system has a problem that it takes time to reach an in-focus state.

The focusing according to the contrast detection system calculates the sharpness of an object image formed by the image-taking optical system through an evaluation using a predetermined function based on the output of the image pickup element and adjusts the position on the optical axis of the image-taking optical system in such a way that the function value takes an extreme value. There are various evaluation functions such as adding up absolute values of differences in brightness signals of adjacent pixels within the focus detection area, and adding up the squares of differences in brightness signals of adjacent pixels within the focus detection area or likewise processing differences in signals of adjacent pixels of R, G and B image signals.

The focusing according to the contrast detection system calculates an evaluation function value while slightly changing the position on the optical axis of the image pickup optical system (focusing lens), and thereby takes a considerable time until an in-focus state is achieved.

On the other hand, in the focusing apparatus disclosed in the above described Document 3, the speed of the focusing operation is enhanced, but pixels of a short optical path length and pixels of a long optical path length are mixed, which makes it not possible to obtain a high quality image. Here, shortening the difference in the optical path length between pixels of a short optical path length and pixels of a long optical path length makes it possible to improve the image quality but it is difficult to decide the focusing direction in focusing control. Therefore, the above described focusing apparatus cannot realize high-speed focusing control and improvement of image quality simultaneously.

The camera system disclosed in above described Document 4 is provided with a focus detection unit according to a phase difference detection system, and can thereby recognize a defocus amount through a single focus detection operation. For this reason, if a focusing lens of the objective lens unit is driven based on the defocus amount, one-time lens driving is all that is required to reach an in-focus state allowing extremely high speed focusing.

Furthermore, in the above described camera system, the reflecting mirror is kept withdrawn from the image-taking optical path during continuous image-taking, the focal plane shutter is fully open and the focus detection unit in the lens apparatus performs a focus detection operation. Therefore, even if the reflecting mirror is withdrawn and the focus detection unit in the camera body is not operating, it is possible to perform high-speed focusing based on the focus detection by the focus detection unit in the lens apparatus.

However, since the above described camera system is provided with two focus detection units, the system becomes a large and costly system.

SUMMARY OF THE INVENTION

One aspect of the image taking apparatus of the present invention comprises a light splitting unit which splits a light flux from an image-taking lens into a plurality of light fluxes, a view finder optical system for observing an object image formed by the light flux from the image-taking lens, an image pickup element which photoelectrically converts the object image to an electrical signal and a focus detection unit for detecting the focusing state of the image-taking lens according to the phase difference detection system. Here, the light splitting unit changes between a first state in which the light flux is directed to the view finder optical system and the focus detection unit and a second state in which the light flux is directed to the image pickup element and the focus detection unit.

Another aspect of the image taking apparatus of the present invention comprises an image pickup element which photoelectrically converts an object image to an electrical signal, an image display unit which displays image data acquired using the image pickup element, a control circuit which controls the driving of the image display unit and a mirror member which can move with respect to the image-taking optical path and allows at least part of the image-taking light flux to pass to the image pickup element side when the mirror member is inserted in the image-taking optical path. Here, the control circuit causes the image display unit to display only part of the image data when the mirror member is inserted the image-taking optical path.

One aspect of the lens apparatus of the present invention comprises a lens apparatus mounted on an image taking apparatus having a first mode in which a light flux from the object is directed to a view finder optical system and a focus detection unit and a second mode in which the light flux is directed to an image pickup element and the focus detection unit comprising; a communication unit which communicates with the image taking apparatus; a light quantity adjusting unit which control the quantity of the light flux directed to the image taking apparatus; and a control circuit which controls the driving of the light quantity adjusting unit according to the communication of the communication unit. Here, the control circuit changes the practice of the control of the light quantity adjusting unit according to the first mode and the second mode.

The features of the image taking apparatus of the invention will become more apparent from the following detailed description of preferred embodiments with reference to the drawings.

DETAILED DESCRIPTION OF THE PREFERRED EMBODIMENTS

Embodiment 1

With reference now to FIG. 1 to FIG. 7, a camera system which is Embodiment 1 of the present invention will be explained.

Figure 6:
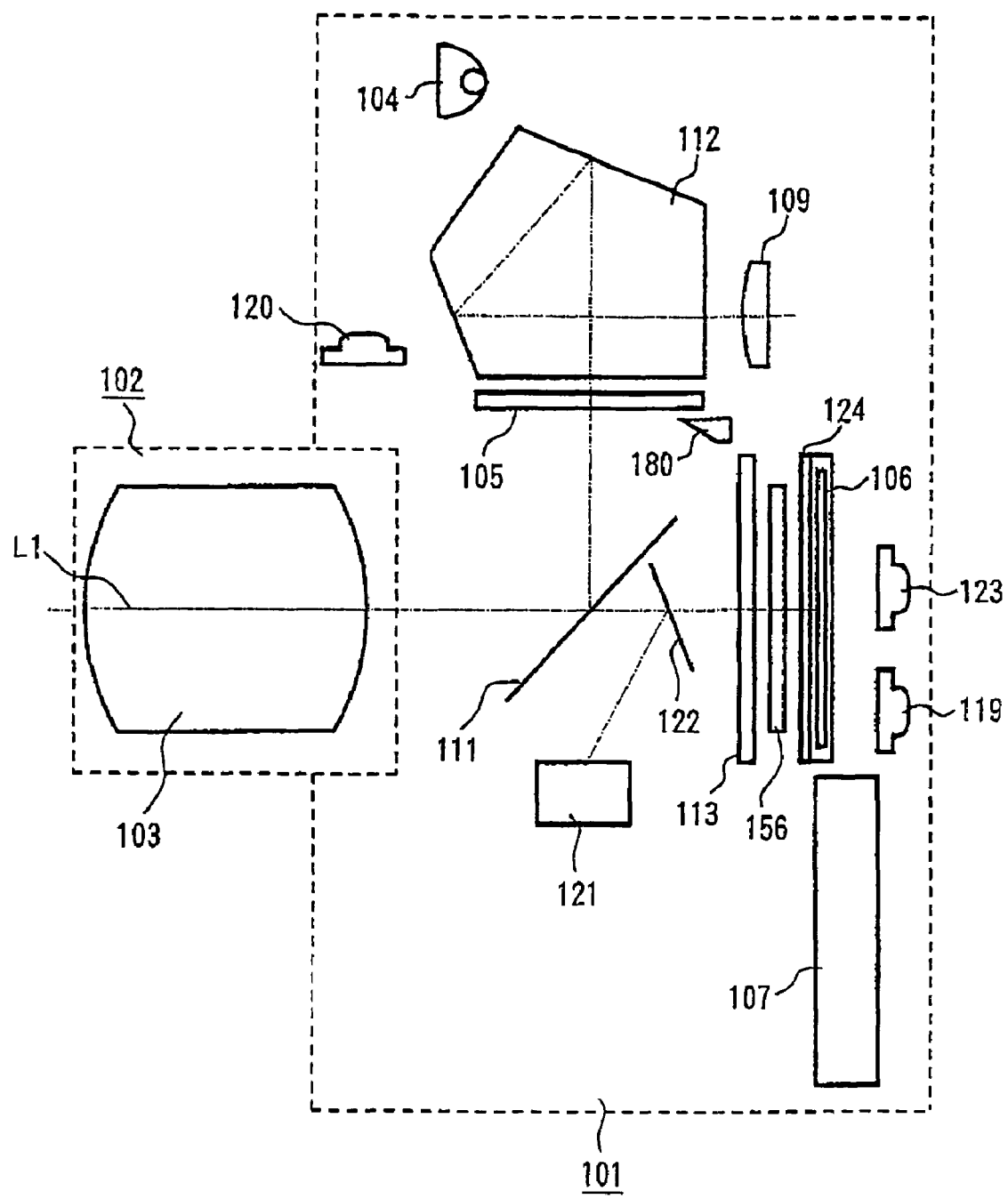
FIG. 6 is a schematic structure of the camera system.

FIG. 6 is a side cross-sectional view showing a schematic structure of the camera system which is this embodiment. The camera system of this embodiment is a single-panel digital color camera using an image pickup element such as a CCD or CMOS sensor and obtains an image signal expressing a moving image or still image by driving the image pickup element continuously or sporadically. Here, the image pickup element is a type of area sensor which converts received light to an electric signal for each pixel, stores charge according to the light quantity and reads out this stored charge.

In FIG. 6, reference numeral 101 denotes a camera body and members which will be explained below are placed inside the camera body to allow image-taking. Reference numeral 102 denotes a lens apparatus, in which an image forming optical system 103 is incorporated and which is attachable/detachable to/from the camera body 101. The lens apparatus 102 is electrically and mechanically connected to the camera body 101 through a publicly known mounting mechanism.

A plurality of lens apparatuses 102 having different focal lengths are attachable/detachable to/from the camera body 101 and changing the lens apparatus makes it possible to obtain image-taking screens of various angles of view.

The lens apparatus 102 has a driving mechanism (not shown) and the driving mechanism can move the focusing lens which is one element of the image taking optical system 103 in the direction of optical axis L1 to thereby perform focusing. Here, it is also possible to form the focusing lens of a flexible transparent elastic member or liquid lens and perform focusing by changing the interface shape and changing the refractive power thereof.

Furthermore, a stop (not shown) which adjusts the light quantity of an image-taking light flux by changing the aperture area of an opening through which light passes and a driving mechanism (not shown) which drives the stop are arranged in the lens apparatus 102.

Reference numeral 106 denotes an image pickup element housed in a package 124. In the optical path from the image taking optical system 103 to the image pickup element 106, an optical low pass filter 156 which constrains the cutoff frequency of the image taking optical system 103 is provided to repress an unnecessarily high spatial frequency component of the object image from being transmitted on the image pickup element 106. Furthermore, an infrared cutoff filter is also formed in the image taking optical system 103.

An object image captured by the image pickup element 106 is displayed on a display unit (image display unit) 107. The display unit 107 is provided on the back face of the camera body 101 to allow the user to directly observe the image displayed on the display unit 107. Here, if the display unit 107 is made up of an organic EL spatial modulation element, a liquid crystal spatial modulation element or a spatial modulation element using particle electrophoresis, etc., it is possible to reduce power consumption and slim down the display unit.

The image pickup element 106 is a CMOS process compatible sensor (CMOS sensor) which is an amplification type solid-state image pickup element. One of features of the CMOS sensor is the ability to form peripheral circuits such as a MOS transistor of the area sensor section, an image pickup element driving circuit, an AD conversion circuit, an image processing circuit in the same step, and therefore the CMOS sensor can drastically reduce the number of masks and process steps compared to a CCD. Furthermore, it has a feature of being able to randomly access arbitrary pixels, easily read only selected parts to be shown on the display and provide real-time displays at a high display rate.

The image pickup element 106 performs a display image output operation and a high definition image output operation taking advantage of the above described feature.

Reference numeral 111 denotes a half mirror (first mirror or mirror member), which leads part of a light flux from the image taking optical system 103 to a view finder optical system (pentaprism 112 or eye piece lens 109), allows the rest of the light flux to pass and thereby divides one optical path into two optical paths. The half mirror 111 is of a movable type, placed diagonally on the image-taking optical path (on L1) or withdrawn from the image-taking optical path. Reference numeral 105 denotes a focusing screen placed on a planned image formation plane of the object image. Reference numeral 112 denotes a pentaprism, which reflects (converts to an erect image) the light flux from the half mirror 111a plurality of times and guides it to the eye piece lens 109.

Reference numeral 109 denotes an eye piece lens for observing the object image formed on the focusing screen 105 which actually has three lenses (109a, 109b, 109c in FIG. 1) as will be described later. The focusing screen 105, the pentaprism 112 and the eye piece lens 109 constitute a view finder optical system.

The half mirror 111 has a refractive index of approximately 1.5 and a thickness of 0.5 mm. A movable type sub-mirror (second mirror) 122 is provided behind the half mirror 111 (on the image pickup element 106 side) to reflect the light flux close to the optical axis L1 out of the light flux which has passed through the half mirror 111 toward a focus detection unit 121.

The sub-mirror 122 is rotatable around a rotation shaft 125 (in FIG. 1) which will be described later and is interlocked with the motion of the half mirror 111. Then, the sub-mirror 122 is housed in the lower part of a mirror box which holds the half mirror 111 and sub-mirror 122 in a second optical path state and a third optical path state which will be described later.

Reference numeral 104 denotes a movable type illumination unit which irradiates the object with illumination light and protrudes from the camera body 101 when used or housed in the camera body 101 when not used.

Reference numeral 113 denotes a focal plane shutter (hereinafter referred to as "shutter") which is provided with a front curtain and rear curtain made up of a plurality of light-blocking blades. When no image is taken, the shutter 113 covers the aperture which constitutes a light passing port with the front curtain or rear curtain to block the image-taking light flux. When an image is taken, the shutter 113 causes the front curtain and rear curtain to form slits and run to allow the image-taking light flux to pass to the image plane side.

Reference numeral 119 denotes a main switch to start the camera. 120 denotes a release button which allows a two-stage pressing operation, starts an image-taking preparation operation (a focusing operation and a photometric operation, etc.) in a half depressed state and starts an image-taking operation in a fully depressed state. Reference numeral 121 denotes a focus detection unit which detects a focusing state according to a phase difference detection system.

Reference numeral 123 denotes a view finder mode changeover switch and operating the switch 123 allows the settings of the optical view finder mode (OVF mode) and electric view finder mode (EVF mode) to be changed. Here, the OVF mode allows the object image to be observed through the view finder optical system and the EVF mode allows the object image to be observed through the display unit 107.

Reference numeral 180 denotes an optical view finder internal information display unit (information display unit) and causes predetermined information (e.g., image-taking information) to be displayed on the focusing screen 105. This allows the photographer to look into the eye piece lens 109 and thereby observe the object image and predetermined information.

In the above described structure, as will be described later, the half mirror 111 and sub-mirror 122 can selectively take three states of a first optical path state (first state) to guide light to the view finder optical system and focus detection unit 121, a second optical path state (second state) to guide light to the image pickup element 106 and focus detection unit 121 and a third optical path state (third state) to allow the image pickup element 106 to directly receive light from the image taking optical system 103.

In the first optical path state, both the half mirror 111 and sub-mirror 122 are placed on the diagonal in the image-taking optical path, light from the image taking optical system 103 is reflected by the half mirror 111 and guided to the view finder optical system and light which has passed through the half mirror 111 is reflected by the sub-mirror 122 and guided to the focus detection unit 121. In this way, in the first optical path state, it is possible to observe the object image through the eye piece lens 109 and perform focus detection at the focus detection unit 121.

In the second optical path state, only the half mirror 111 is placed on the diagonal in the image-taking optical path and light from the image taking optical system 103 is reflected by the half mirror 111 and guided to the focus detection unit 121 and the light which has passed through the half mirror 111 can reach the image pickup element 106. The sub-mirror 122 is withdrawn from the image-taking optical path.

In this way, in the second optical path state, it is possible to display an image obtained using the image pickup element 106 on the display unit 107, perform image-taking (continuous image-taking or moving image-taking) and perform focus detection at the focus detection unit 121.

In the third optical path state, the half mirror 111 and sub-mirror 122 are withdrawn from the image-taking optical path and light from the image taking optical system 103 can directly reach the image pickup element 106. In this way, in the third optical path state, it is possible to perform image-taking or display the image obtained using the image pickup element 106 on the display unit 107. This image-taking in the third optical path state allows a high definition image to be generated and is particularly suitable for a case where the image which has been taken is expanded or subjected to large-size printing, etc.

The half mirror 111 is made of transparent resin and designed to weigh less to be able to change between the above described three optical path states at high speed. Furthermore, a polymer thin-film having birefringence is pasted to the back of the half mirror 111. For this reason, in the second optical path state when the image which has been taken is monitored using the display unit 107 or a high-speed continuous image-taking is performed, a stronger low pass effect is provided in response to a case where image pickup is not performed using all pixels of the image pickup element 106.

Furthermore, by forming a micro pyramidal periodic structure having a pitch smaller than the wavelength of visible light of resin on the surface of the half mirror 111, causing it to act as a photonic crystal, it is possible to reduce surface reflection of light due to a refractive index difference between air and resin and thereby improve the utilization efficiency of light. This structure can suppress any ghost from being produced due to multiple reflection of light on the front and back of the half mirror 111 in the second optical path state.

A mirror driving mechanism having an electromagnetic motor and gear train (not shown) changes the positions of the half mirror 111 and sub-mirror 122 and thereby changes the optical path state between the first optical path state, the second optical path state and the third optical path state.

In the image pickup of the second optical path state, the half mirror 111 and sub-mirror 122 are held at predetermined positions as will be described later and there is no need to operate the mirror driving mechanism, and therefore increasing the image signal processing speed allows ultra-high-speed continuous image-taking. Furthermore, focusing is possible even when an image is displayed on the display unit 107.

Figure 7:
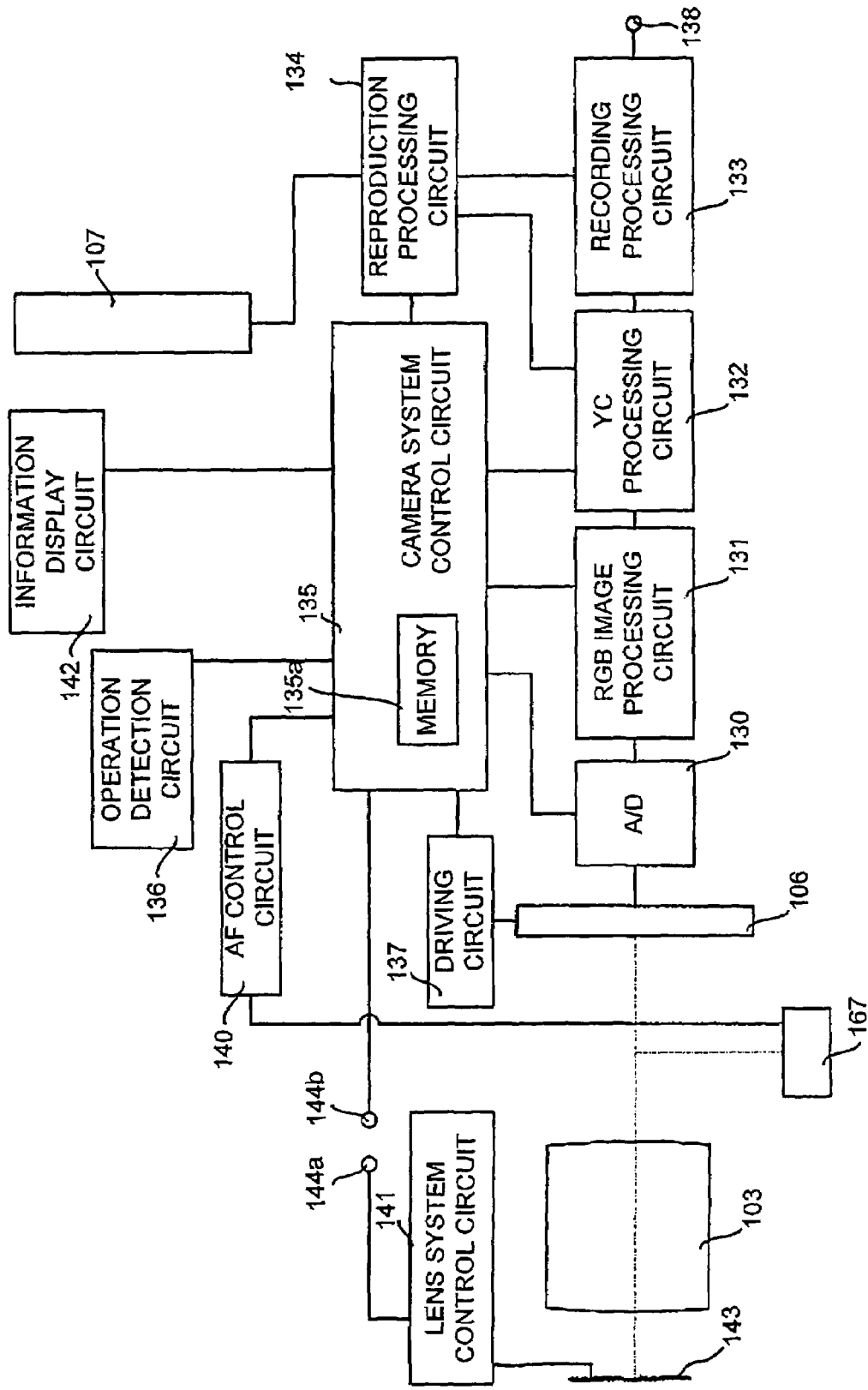
FIG. 7 is a block diagram showing an electrical structure of the camera system.

FIG. 7 is a block diagram showing an electrical structure of the camera system of this embodiment. This camera system has an image pickup system, an image processing system, a recording/reproduction system and a control system. First, image pickup and recording of an object image will be explained. In FIG. 7, the same members as the members explained in FIG. 6 are assigned the same reference numerals.

The image pickup system includes the image taking optical system 103 and image pickup element 106 and the image processing system includes an A/D converter 130, an RGB image processing circuit 131 and a YC processing circuit 132. Furthermore, the recording/reproduction system includes a recording processing circuit 133 and a reproduction processing circuit 134 and the control system includes a camera system control circuit (control circuit) 135, an operation detection circuit 136 and an image pickup element driving circuit 137.

Reference numeral 138 is a connection terminal standardized to be connected to an external computer, etc., to perform data transmission/reception. The above described electric circuit is driven by a small fuel cell (not shown).

The image pickup system is an optical processing system which forms an image of light from an object on an image pickup plane of the image pickup element 106 through the image taking optical system 103, adjusts the driving of a stop 143 in the lens apparatus 102 and the front curtain and rear curtain of the shutter 113 if necessary and allows the image pickup element 106 to be exposed to the object light of appropriate light quantity.

The image pickup element 106 consists of 3700 and 2800 square pixels arranged in the long side direction and in the short side direction respectively, approximately 10 million pixels in total, with each pixel provided with R (red), G (green) and B (blue) color filters alternately arranged, four pixels forming one set, that is, a Bayer array.

In the Bayer array, the number of G pixels which are likely to appeal more strongly to the eyes of the photographer is more than the number of R and B pixels respectively and thereby comprehensive image performance is improved. Generally, in image processing using the image pickup element 106 having the Bayer array, luminance signals are generated from G and color signals are principally generated from R, G and B.

The image signal read from the image pickup element 106 is supplied to the image processing system through the A/D converter 130. The A/D converter 130 is a signal conversion circuit which converts an analog signal to, for example, a 10-bit digital signal and outputs it according to the amplitude of a signal of each pixel exposed to light and subsequent image signal processing is performed by digital processing.

The image processing system is a signal processing system which obtains an image signal of a desired format from R, G, B digital signals and converts R, G, B color signals to luminance signal Y and YC signal expressed by color difference signals (R-Y) and (B-Y), etc.

The RGB image processing circuit 131 is a signal processing circuit which processes an image signal of 3700×2800 pixels received from the image pickup element 106 through the A/D converter 130 and is provided with a white balance circuit, a gamma correction circuit and an interpolation calculation circuit which increases resolution through interpolation calculation.

The YC processing circuit 132 is a signal processing circuit which generates a luminance signal Y and color difference signals R-Y and B-Y. The processing circuit 132 has a high-frequency luminance signal generation circuit, which generates a high-frequency luminance signal YH, a low-frequency luminance signal generation circuit which generates a low-frequency luminance signal YL, and a color difference signal generation circuit, which generates color difference signals R-Y and B-Y. The luminance signal Y is formed by combining the high-frequency luminance signal YH and the low-frequency luminance signal YL.

The recording/reproduction system is a processing system which outputs an image signal to memory (recording medium, not shown) and the display unit 107. The recording processing circuit 133 performs writing processing and reading processing on an image signal to/from the memory. The reproduction processing circuit 134 reproduces the image signal read from the memory and outputs the reproduced image signal to the display unit 107.

Furthermore, the recording processing circuit 133 is provided with a compression/expansion circuit which compresses a YC signal expressing a still image and a moving image according to a predetermined compression format (e.g., JPEG format) and expands the compressed data when it is read. The compression/expansion circuit includes a frame memory for signal processing, etc., and stores the YC signal from the image processing system in the frame memory for each frame, reads the YC signal for every plurality of blocks and compresses and codes the YC signal. Compression and coding are performed by applying two-dimensional orthogonal conversion, normalization and Huffman coding to the image signal for each block, etc.

The reproduction processing circuit 134 is a circuit which converts the luminance signal Y and color difference signals R-Y and B-Y by a matrix conversion and for example, generates RGB signals. The signals converted by the reproduction processing circuit 134 are output to the display unit 107 and visible images are displayed (reproduced) on the display unit 107.

The reproduction processing circuit 134 and display unit 107 can be connected through a radio communication channel such as Bluetooth and this structure allows an image picked up by a camera to be monitored from a remote place.

On the other hand, the operation detection circuit 136 which is part of the control system detects operations of the release button 120 and the view finder mode changeover switch 123, etc. Furthermore, the camera system control circuit 135 controls the driving of each member in the camera including the half mirror 111 and the sub-mirror 122 according to the detection signal of the operation detection circuit 136, generates and outputs a timing signal when an image pickup operation is performed.

The image pickup element driving circuit 137 generates a driving signal which drives the image pickup element 106 under the control of the camera system control circuit 135. The information display circuit 142 controls the driving of the optical view finder internal information display unit 180.

The control system controls the driving of each circuit of the image pickup system, image processing system and recording/reproduction system according to an external operation. For example, the control system detects that the release button 120 is depressed, controls the driving of the image pickup element 106, operation of the RGB image processing circuit 131 and compression processing of the recording processing circuit 133, etc. Furthermore, the control system controls the state of each segment in the information displayed in the optical view finder by a view finder internal information display circuit 142.

Then, the focusing will be explained. An AF control circuit 140 and lens system control circuit 141 are connected to the camera system control circuit 135. These control circuits communicate data necessary for various types of processing with each other centered on the camera system control circuit 135.

The AF control circuit 140 generates a focus detection signal by receiving the output signal of a focus detection sensor 167 corresponding to the focus detection area provided at a predetermined position on the image-taking screen and detects the in-focus state (defocus amount) of the image taking optical system 103.

When the defocus amount is detected, this defocus amount is converted to an amount of driving of the focusing lens, which is an element of the image taking optical system 103, and is sent to the lens system control circuit 141 through the camera system control circuit 135.

With regard to a moving object, considering a time lag after the release button 120 is depressed until the actual image pickup operation is started, an amount of driving of the focusing lens is calculated based on the result of predicting an appropriate lens stopping position. Furthermore, when it is decided based on a detection result of a luminance detection unit (not shown) which detects the luminance of the object and is provided in the camera body 101, that the luminance of the object is low and sufficient focus detection accuracy is not obtained, the object is illuminated using the illumination unit 104 or using a white LED or a fluorescent tube (not shown) provided in the camera body 101.

When the lens system control circuit 141 receives the data showing the amount of driving of the focusing lens sent from the camera system control circuit 135, it performs an operation, such as moving the focusing lens using a driving mechanism (not shown) in the lens apparatus 102, in the direction of the optical axis L1 to realize focusing.

When the AF control circuit 140 detects that focus is achieved on the object, this detection information is transmitted to the camera system control circuit 135. At this time, if the release button 120 is depressed, the processing operation as described above is performed by the image pickup system, image processing system and recording/reproduction system.

The stop 143 adjusts a quantity of the object light directed to the image plane side according to a command from the lens system control circuit 141. A communication exchanged between the camera system control circuit 135 and the lens system control circuit 141 is performed through an electric contact (communication unit) 144a provided on a mount portion of a lens apparatus 102 and an electric contact 144b provided on a mount portion of a camera body 101.

FIG. 1 to FIG. 5 are longitudinal sectional views of the camera system of this embodiment. The lens apparatus 102 is only partially shown. These figures principally show operations of the driving mechanisms (mirror driving mechanisms) of the half mirror 111 and sub-mirror 122 on a time-series basis. The same members as the members explained in FIG. 6 and FIG. 7 are assigned the same reference numerals.

Figure 3:
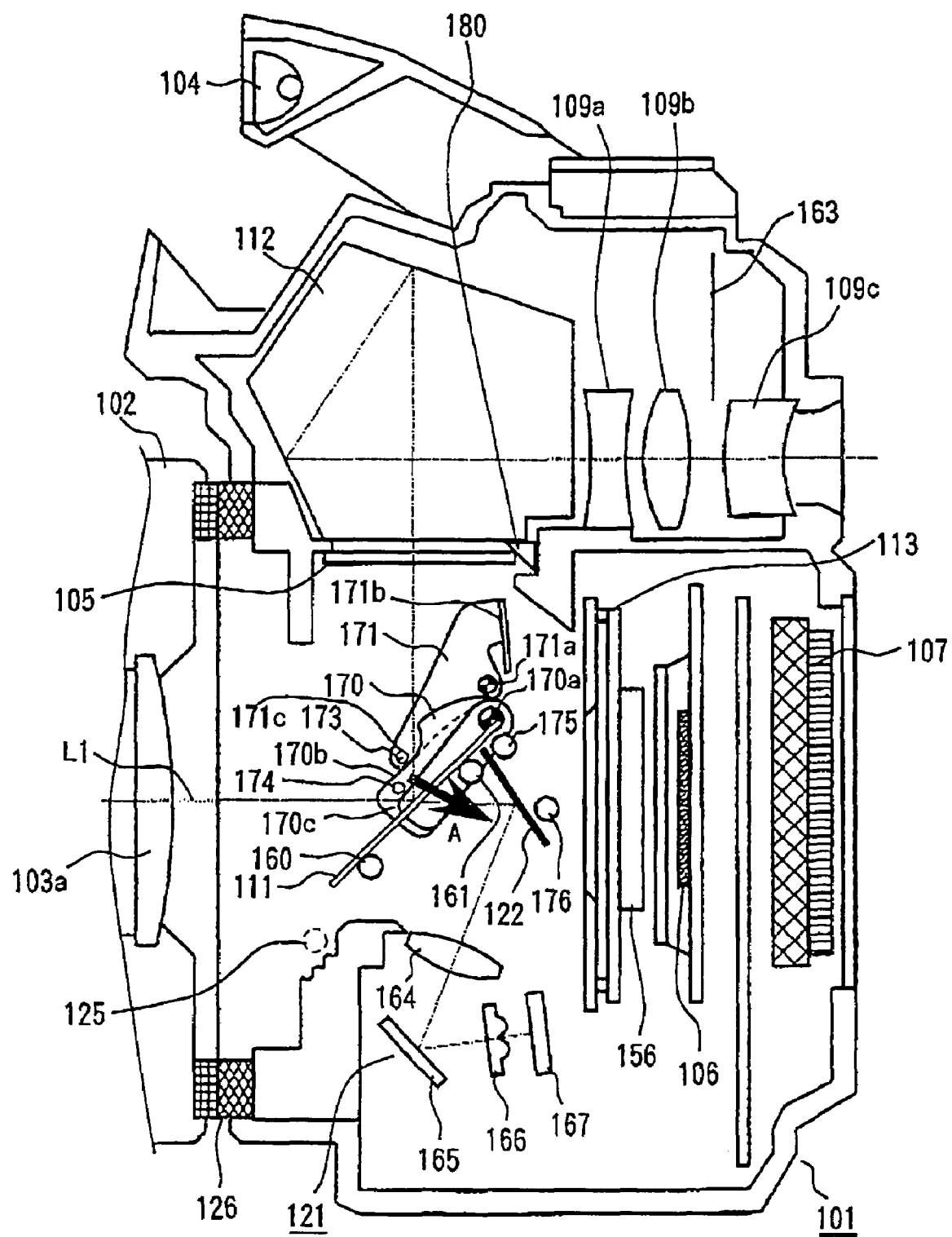
FIG. 3 is a longitudinal sectional view of the camera system.

The structure of the mirror driving mechanism will be explained using FIG. 3. FIG. 3 shows a view when the camera is in the above described first optical path state.

In FIG. 3, reference numeral 101 denotes a camera body, reference numeral 102 denotes a lens apparatus, reference numeral 103a denotes a lens located closest to the image plane out of a plurality of lenses making up the image taking optical system, reference numeral 105 denotes a focusing screen of a view finder optical system. Reference numeral 164 denotes a condenser lens which serves as a window for taking in a light flux of a focus detection unit 121 and reference numeral 107 denotes a display unit. Reference numeral 163 denotes an eye piece shutter (light-blocking member) which can move with respect to the optical path of the view finder optical system. The eye piece shutter is the member which suppresses an adverse effect on image pickup due to the light from the eye piece lens 109 side.

A movable type half mirror 111 is supported by a half mirror receiving plate (not shown). The half mirror receiving plate is provided with pins 173 and 174, and the half mirror 111 and pins 173 and 174 are unified through the half mirror receiving plate and are movable.

Reference numeral 170 denotes a half mirror driving lever, reference numeral 171 denotes a half mirror support arm. The half mirror driving lever 170 is supported to a rotation shaft 170a in a rotatable manner and the half mirror support arm 171 is supported by a rotation shaft 171a in a rotatable manner.

The half mirror driving lever 170 is connected to a drive source through a power transmission mechanism (not shown) and can rotate around the rotation shaft 170a by receiving a driving force from the drive source. Furthermore, the half mirror support arm 171 is connected to a member of substantially the same shape on the facing wall side of a mirror box through a connection portion 171b.

A pin 173 provided on the half mirror receiving plate (not shown) is fitted into a through hole portion 171c provided at the end of the half mirror support arm 171 in a slidable manner. This allows the half mirror 111 to rotate around the through hole portion 171c (pin 173) through the half mirror receiving plate. Furthermore, a spring force by a torsion spring (not shown) in the direction shown by an arrow A is applied to a position intermediate between the pins 173 and the pin 174 of the half mirror receiving plate.

In the first optical path state (FIG. 3), mirror stoppers (stopper members) 160 and 161 are outside the image-taking optical path and inside the range of the moving track of the half mirror 111. By receiving the spring force of the torsion spring in the direction indicated by the arrow A in the state shown in FIG. 3, the half mirror 111 contacts the mirror stoppers 160 and 161 and is positioned. This causes the half mirror 111 to be placed on the diagonal in the image-taking optical path.

Here, the pin 173 does not contact a first cam face 170b of the half mirror driving lever 170 and the pin 174 does not contact a second cam face 170c of the half mirror driving lever 170.

Furthermore, the sub-mirror 122 is positioned on the back of the half mirror 111 with its rotation around a rotation shaft 125 suppressed.

In the first optical path state, the light flux reflected by the half mirror 111 out of the light fluxes which have passed through the image taking optical system 103 (lens 103a) is guided to the view finder optical system and the light flux which has passed through the half mirror 111 is reflected by the sub-mirror 122 behind the half mirror 111 and guided to the focus detection unit 121.

When the mirror stoppers 160 and 161 are withdrawn from the range of the moving track of the half mirror 111 or when the half mirror driving lever 170 rotates clockwise in FIG. 3, the pin 173 contacts the first cam face 170b of the half mirror driving lever 170 and the pin 174 contacts the second cam face 170c of the half mirror driving lever 170 through the spring force of the torsion spring (not shown) in the direction indicated by the arrow A.

Then, the pins 173 and 174 move along the first cam face 170b and the second cam face 170c according to the amount of rotation of the half mirror driving lever 170. This changes the posture of the half mirror 111.

That is, the half mirror receiving arm 171 rotates in connection with the rotation of the half mirror driving lever 170. Then, the half mirror support plate connected to the half mirror driving lever 170 and the half mirror support arm 171 through the pins 173 and 174 operates and the half mirror 111 operates together with the half mirror receiving plate.

Figure 1:
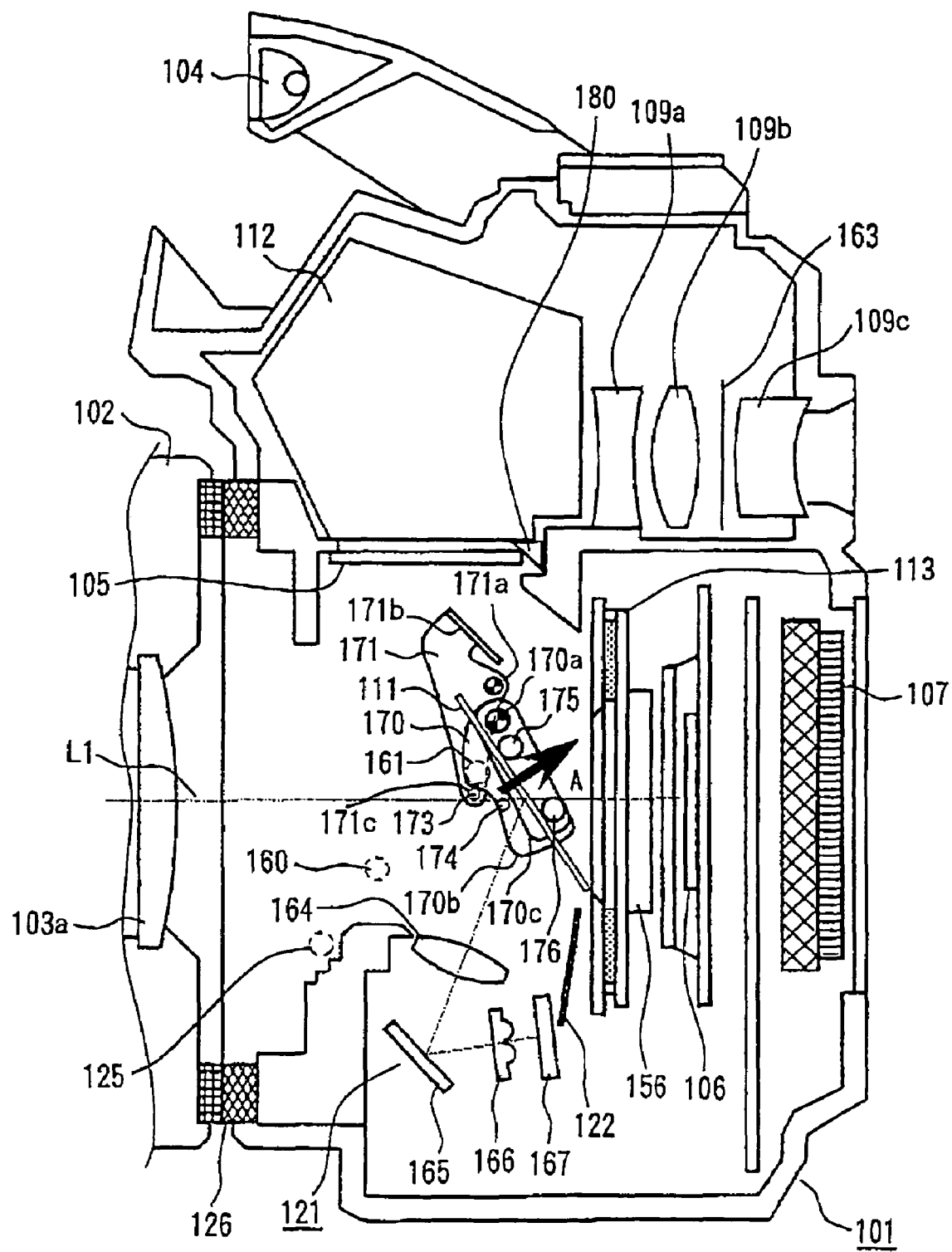
FIG. 1 is a longitudinal sectional view of a camera system which is Embodiment 1 of the present invention.
Figure 2:
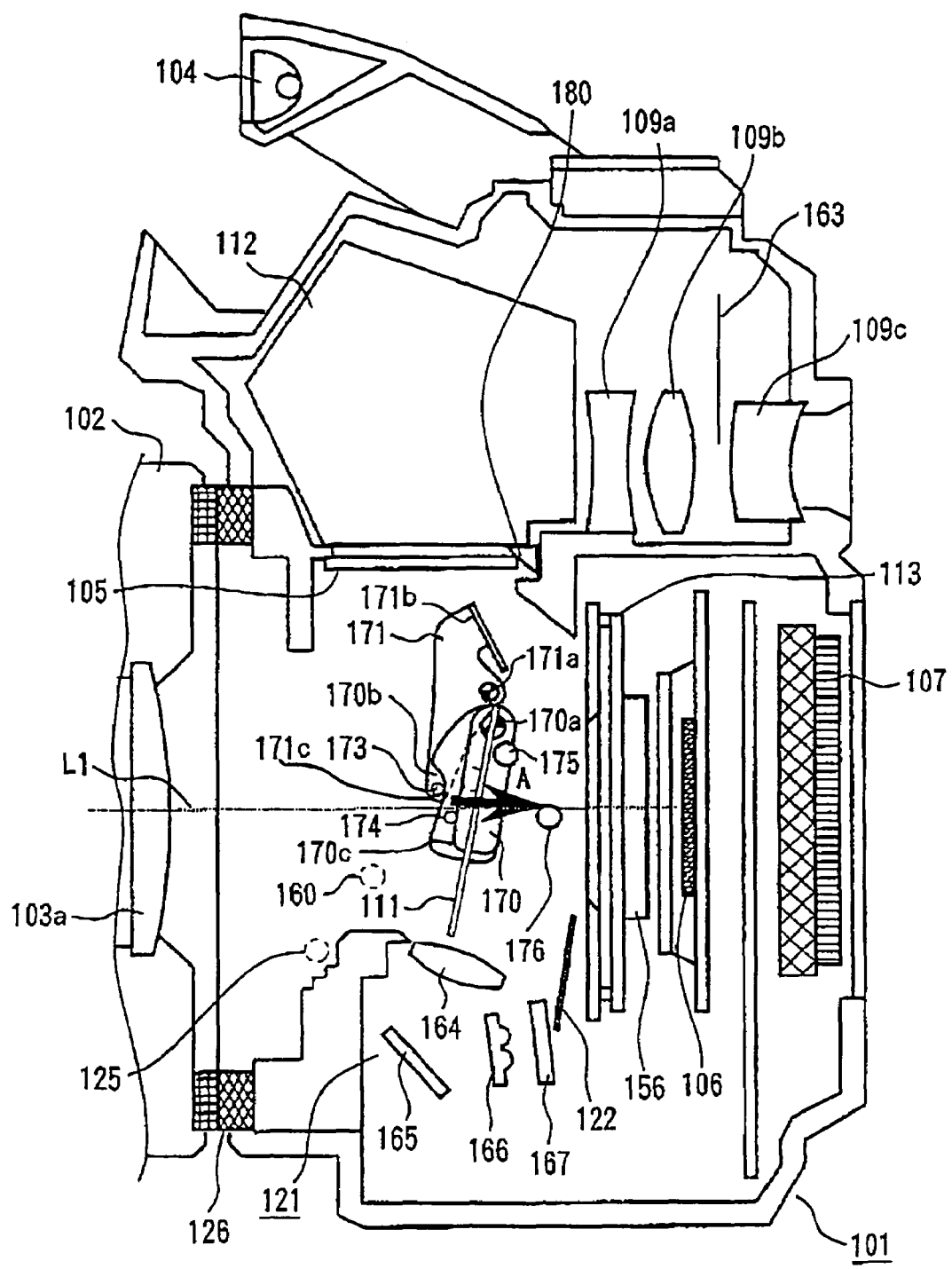
FIG. 2 is a longitudinal sectional view of the camera system.
Figure 4:
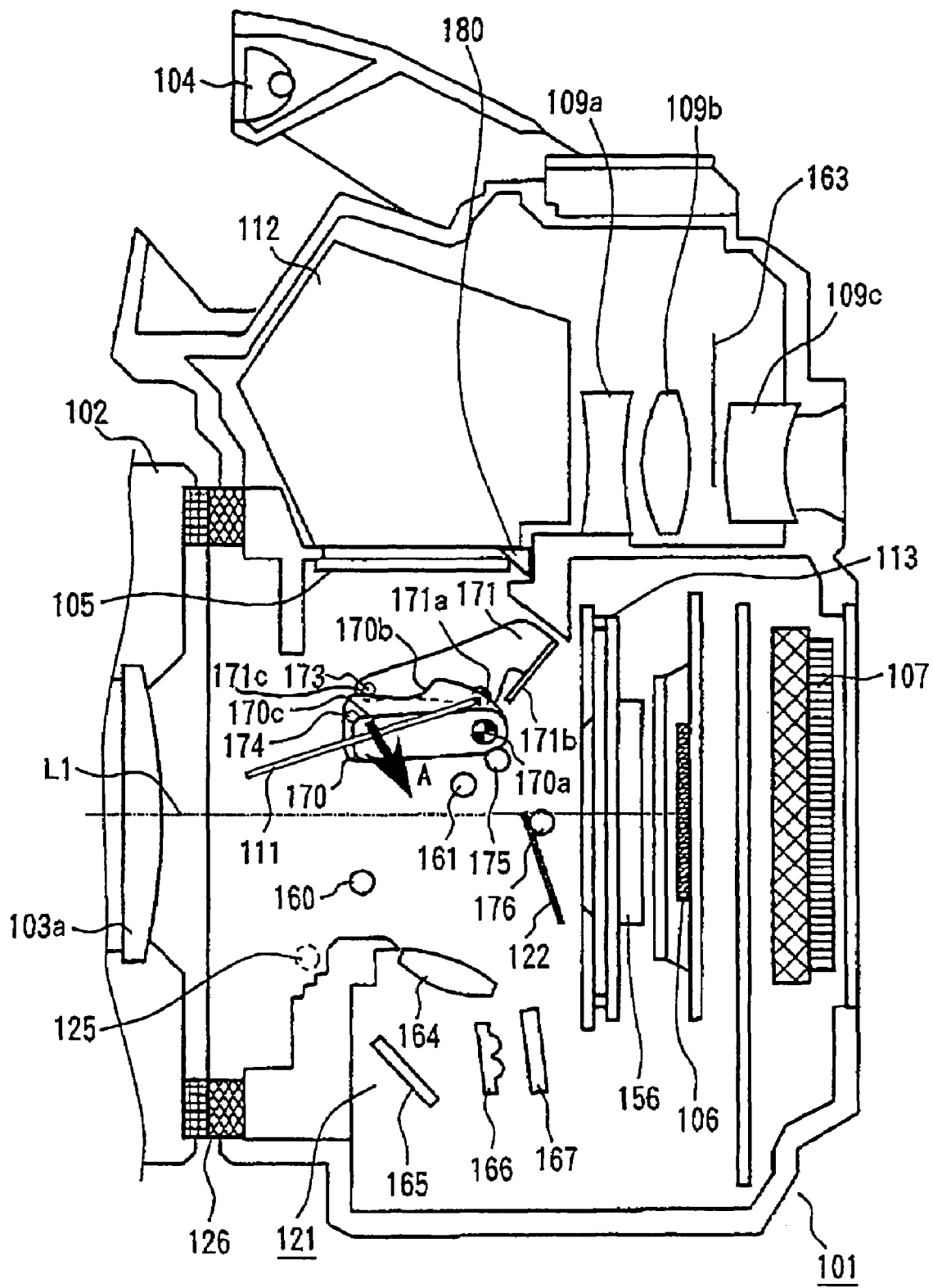
FIG. 4 is a longitudinal sectional view of the camera system.
Figure 5:
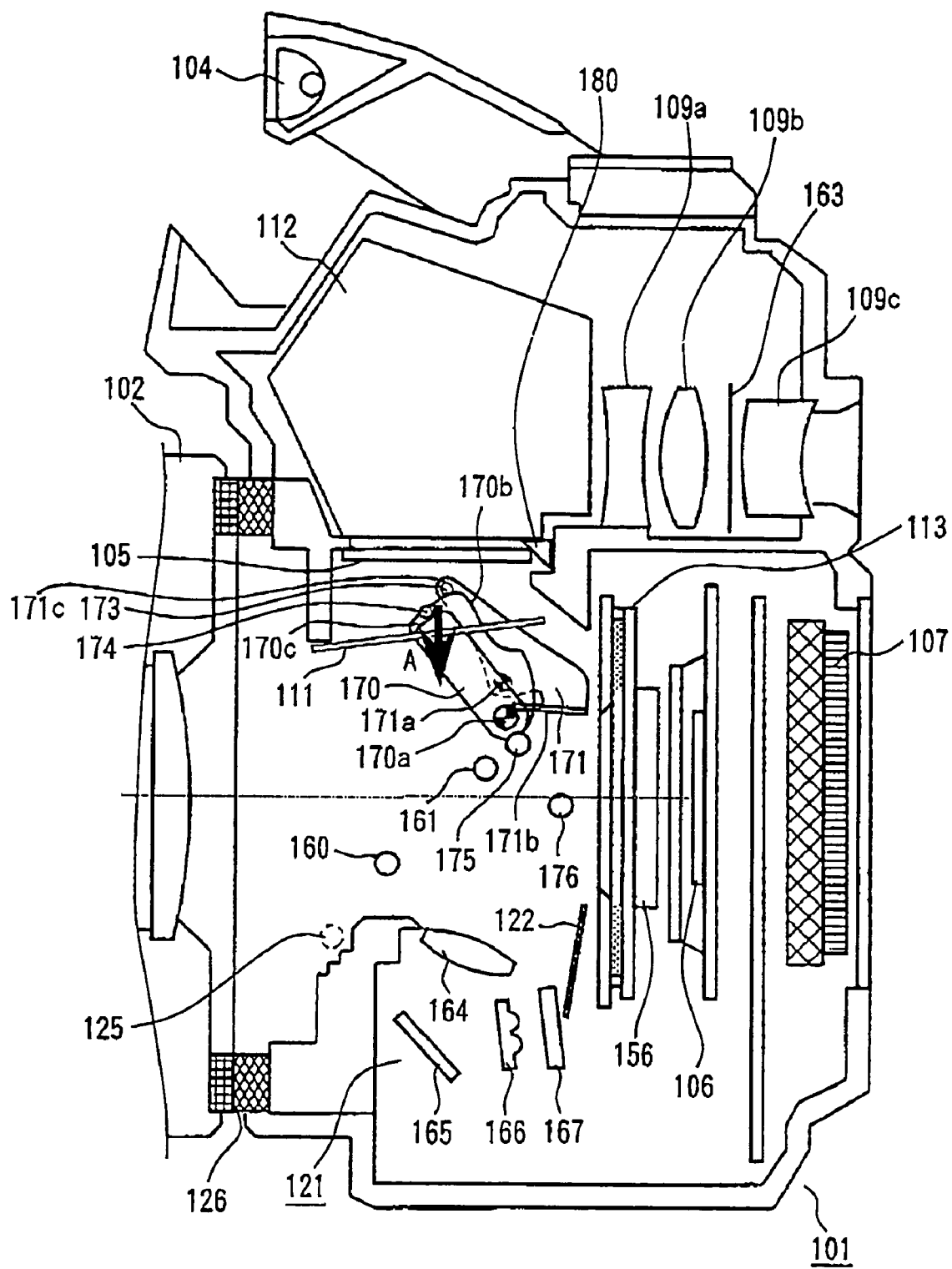
FIG. 5 is a longitudinal sectional view of the camera system.

FIG. 1 to FIG. 5 show operations of the half mirror 111 and the sub-mirror 122. FIG. 1 shows the above described second optical path state, FIG. 2 shows a partway transition from the first optical path state to the second optical path state. FIG. 4 shows a process of transition from the first optical path state to the third optical path state and FIG. 5 shows the above described third optical path state.

In the first optical path state (FIG. 3), as described above, the half mirror 111 and the sub-mirror 122 operate so as to guide the object light emitted from the image taking optical system 103 to the view finder optical system and the focus detection unit 121.

In the second optical path state (FIG. 1), the half mirror 111 operates so as to guide the object light emitted from the image taking optical system 103 to the image pickup element 106 and the focus detection unit 121. Furthermore, in the third optical path state (FIG. 5), the half mirror 111 and the sub-mirror 122 withdraw from the image-taking optical path.

Then, an image-taking sequence in the camera system of this embodiment will be explained using FIG. 8 below.

In step S1, the process waits until the main switch 119 is operated (ON state) and advances to step S2 when operated. In step S2, a current is supplied to various electric circuits in the camera body 101.

In step S3, the set view finder mode is identified and if an OVF mode is set, the process advances to step S4, and if an EVF mode is set, the process advances to step S5.

In step S4, predetermined information is displayed on the display section provided in the optical view finder by driving the optical view finder internal information display unit 180. In the OVF mode, it is possible to observe not only the above described predetermined information but also the object image through the eye piece lens 109.

In step S5, an image and predetermined information are displayed on the display unit 107. In the EVF mode, it is possible to observe not only the above described predetermined information but also the object image through the display unit 107.

Here, when the operation detection circuit 136 detects that the view finder mode changeover switch 123 has been operated, the view finder mode is changed. For example, when the OVF mode is changed to the EVF mode, an image (object image) is displayed on the display unit 107 through the driving of the image pickup system and the image processing system.

In step S6, the process waits until it is detected that the release button 120 is half depressed based on the output of the operation detection circuit 136, that is, until SW1 is put in an ON state and advances to step S7 when SW1 is put in an ON state.

In step S7, the luminance of the object is measured (photometric operation) and the focus detection unit 121 detects the focusing state according to a phase difference detection system (focus detection operation).

These detection results obtained in step S7 are sent to the camera system control circuit 135 and an exposure value (shutter speed and stop value) and defocus amount are calculated. Then, based on the calculated defocus amount, the focusing lens of the image taking optical system 103 is driven for focusing under the control of the AF control circuit 140 and the lens system control circuit 141. Furthermore, a stop (not shown) is driven based on the calculated stop value and the area of the aperture through which the light passes is changed.

In step S8, based on the output of the operation detection circuit 136, the camera system control circuit 135 decides whether the release button 120 has been fully depressed or not, that is, whether SW2 is in an ON state or not. Here, if SW2 is in an ON state, the process advances on to step S9, and if SW2 is in an OFF state, the process returns to step S6.

In step S9, the half mirror 111 and the sub-mirror 122 are put in the third optical path state (FIG. 5) by driving the mirror driving mechanism. In step S10, the image pickup element 106 is exposed to light by operating the shutter 113 based on the shutter speed calculated before and in step S11, the image processing system captures a high definition image.

Here, the above described image-taking sequence applies to a case where a high definition image is taken and the sequence in a case where high-speed continuous image-taking is performed partially differs from the above described sequence. That is, the half mirror 111 and the sub-mirror 122 are in the second optical path state (FIG. 1) and the aperture of the shutter 113 remains open.

In the second optical path state, the light flux from the image taking optical system 103 is divided into the component to be reflected to the focus detection unit 121 by the half mirror 111 and the component which passes through the half mirror 111. Then, an image is taken when the component which has passed through the half mirror 111 is received by the image pickup element 106. When continuous image-taking is performed, the mirror driving mechanism is not driven, and therefore the half mirror 111 is held in the same state (state in FIG. 1).

The camera of this embodiment is structured in such a way that even when the image picked up is monitored on the display unit 107, a high-speed focusing operation (driving of the focusing lens) can be performed by detecting the focusing state according to the phase difference detection system through the focus detection unit 121.

Then, the changeover operation between the view finder modes will be explained.

Figure 8:
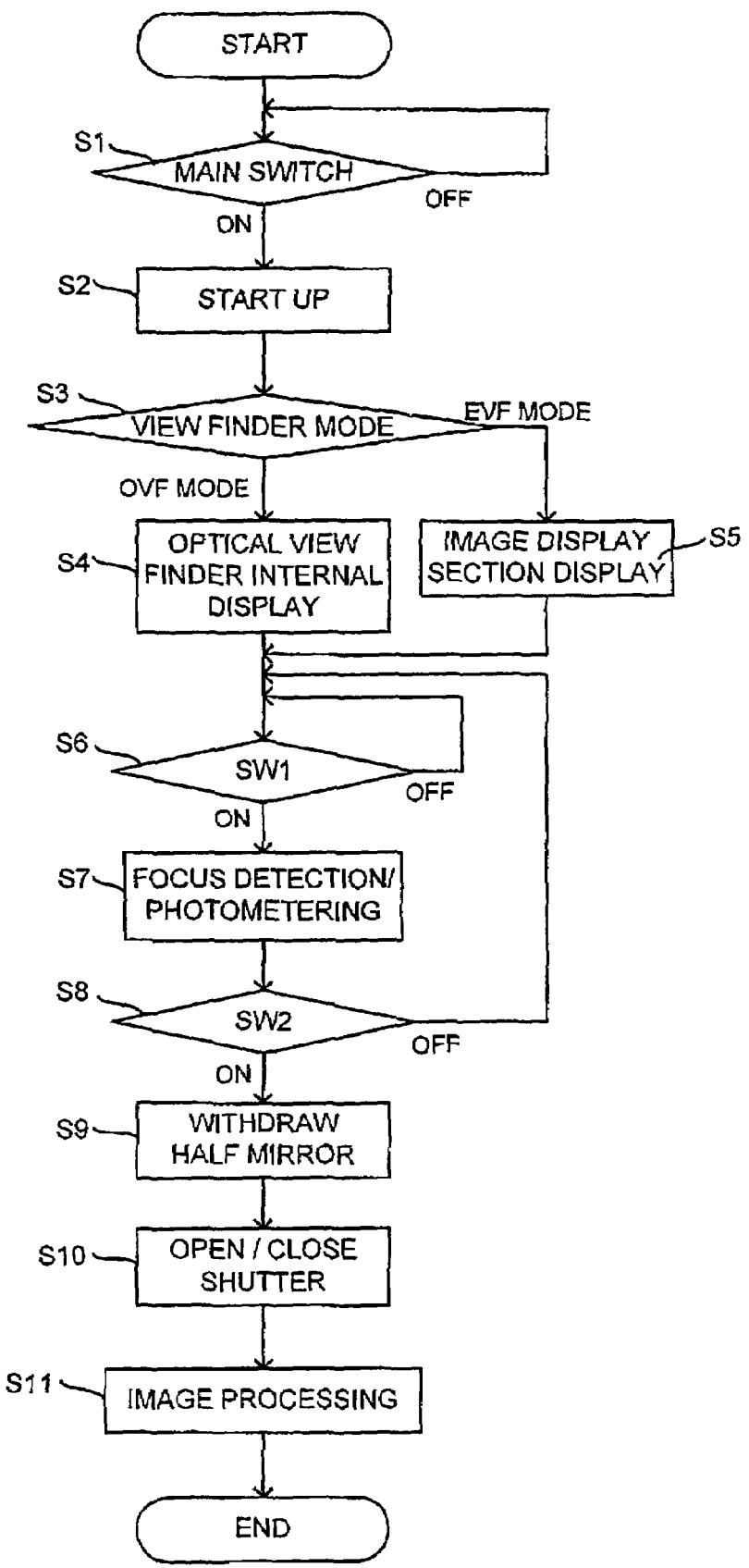
FIG. 8 is a flow chart illustrating an image-taking sequence of the camera system.

While the electric circuit in the camera is operating, the state (ON/OFF) of each operation switch is detected through the operation detection circuit 136 and when it is detected that the view finder mode changeover switch 123 has been operated, the changeover operation of the view finder mode (OVF mode and EVF mode) is started immediately (step S3 in FIG. 8).

Figure 9:
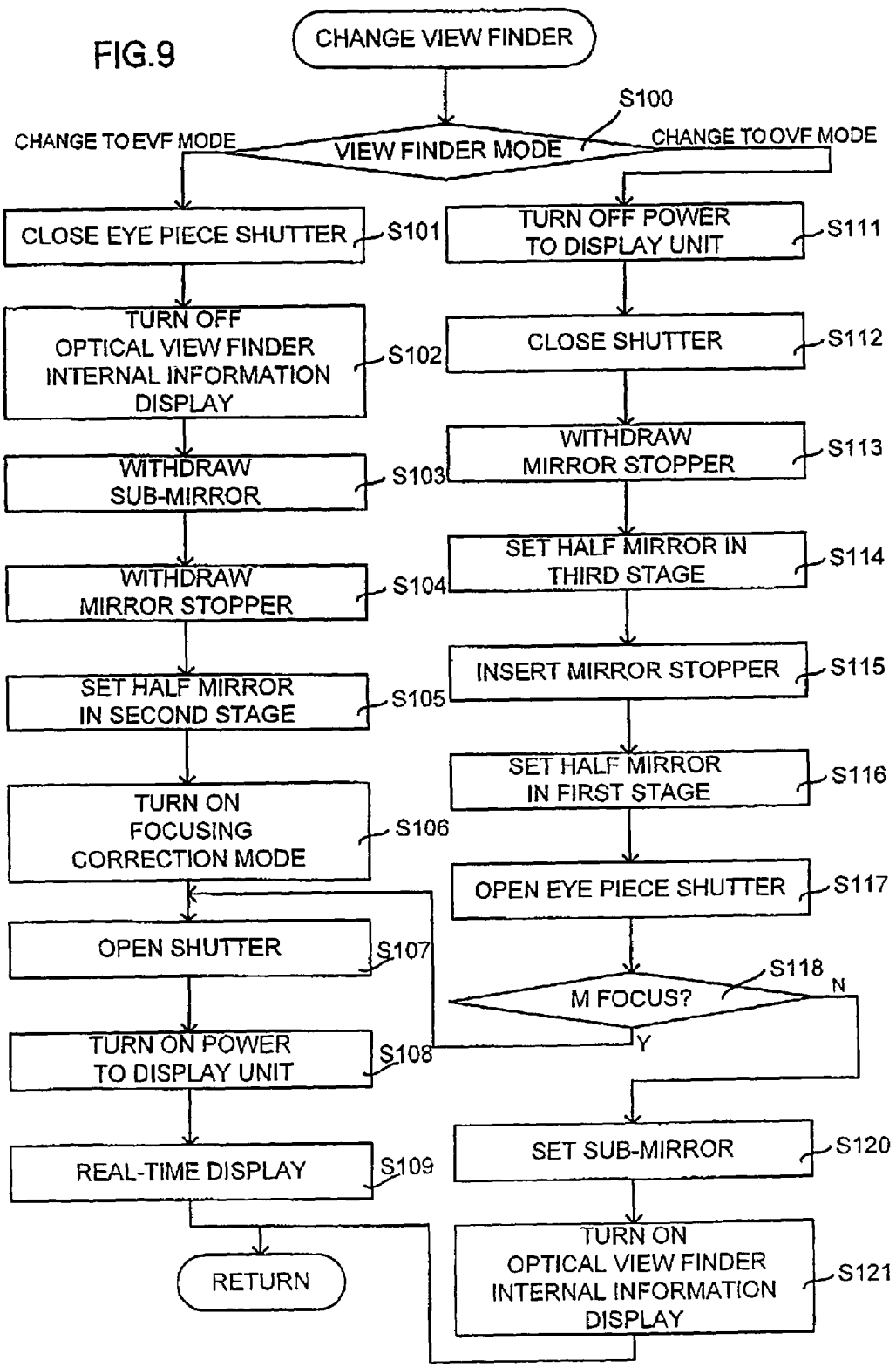
FIG. 9 is flow chart illustrating a view finder mode switching operation.

FIG. 9 is a flow chart illustrating the changeover operation of the view finder mode and this operation will be explained below according to this flow.

In step S100, the actual view finder mode is detected, and when the OVF mode is changed to the EVF mode through the operation of the view finder mode changeover switch 123, the process advances on to step S101. On the other hand, when the EVF mode is changed to the OVF mode, through the operation of the view finder mode changeover switch 123, the process advances on to step S111.

First, the case where the OVF mode is changed to the EVF mode will be explained.

In the OVF mode, the optical path splitting system, including the half mirror 111 and the sub-mirror 122, is in the first optical path state (FIG. 3). In the EVF mode, the object light is not guided to the optical view finder, and therefore in step S101, the camera system control circuit 135 drives the drive source (not shown) to thereby close the eye piece shutter 163 first. That is, the eye piece shutter 163 is inserted in the view finder optical path between the lens 109b and lens 109c.

This is intended to prevent the photographer from mistaking a phenomenon that the object image can not be observed invisible through the eye piece lens 109 when the EVF mode is set, for a camera failure and repress inverse incident light from the optical view finder from entering the image pickup element 106 and thereby causing a ghost image to be produced.

In step S102, information in the optical view finder is in a non-display state through the driving control of the view finder internal information display unit 180. This is because the eye piece shutter 163 is already closed in step S101 and even if information is displayed in the optical view finder, the photographer cannot see this display. This makes it possible to reduce power consumption and suppress consumption of the battery.

In step S103, the mirror driving mechanism is operated and the sub-mirror 122 is thereby withdrawn to the lower part of the mirror box (FIG. 1) in preparation for changing the state of the half mirror 111 to the second optical path state (FIG. 1).

In step S104, the mirror stoppers 160 and 161 are withdrawn from the moving track of the half mirror 111. After the mirror stoppers 160 and 161 are withdrawn, in step S105, the half mirror driving lever 170 is rotated counterclockwise in FIG. 3 through the mirror driving mechanism. The half mirror 111 receives the spring force of the torsion spring (not shown) in the direction indicated by the arrow A and is thereby changed through the state shown in FIG. 2 to the second optical path state (FIG. 1).

When the half mirror 111 is in the second optical path state, part of the light flux from the image taking optical system 103 is reflected by the half mirror 111 and guided to the focus detection unit 121. Furthermore, the remaining light flux passes through the half mirror 111 and is directed to the image pickup element 106.

In the second optical path state, the half mirror 111 receives the spring force of the torsion spring in the direction indicated by the arrow A, contacts the mirror stoppers 175 and 176 located outside the image-taking optical path and is thereby positioned. At this time, the pin 173 does not contact the first cam face 170b of the half mirror driving lever 170 and the pin 174 does not contact the second cam face 170c of the half mirror driving lever 170.

The position of the reflecting surface of the half mirror 111 is the position at which the reflecting surface of the sub-mirror 122 in the first optical path state is located. Such a structure makes it possible to eliminate a difference between the light reflected by the sub-mirror 122 (in the first optical path state) and guided to the focus detection unit 121, and the light reflected by the half mirror 111 (in the second optical path state) and guided to the focus detection unit 121, and prevent the position of the focus detection area from changing at all.

Here, the focusing position of the object image formed by the light flux which has passed through the half mirror 111 may be slightly deviated from the focusing position in a case where object light does not pass through the half mirror 111. For this reason, in step S106, a focusing correction mode is started to correct the deviation of the focusing position.

In the first optical path state, when the image taking optical system 103 is in the in-focus state and the half mirror 111 and sub-mirror 122 are withdrawn from the image-taking optical path (in the third optical path state), the focus detection unit 121 outputs a focus detection signal so that the object image is formed sharply on the image pickup element 106.

In contrast, when the image taking optical system 103 is in the in-focus state and the focusing correction mode is set in the second optical path state, the focus detection signal of the focus detection unit 121 is corrected so that the object image which has passed through the half mirror 111 and has been projected onto the image pickup element 106 is formed sharply. When the focusing correction mode is set in the second optical path state, this causes the in-focus position of the focusing lens in the second optical path state to be deviated from the in-focus position of the focusing lens in the third optical path state by the amount of correction of the focus detection signal of the focus detection unit 121.

Therefore, while the EVF mode is set, when the release button 120 is fully depressed, the image pickup operation is started and the second optical path state is changed to the third optical path state, the front curtain driving mechanism of the shutter 113 is charged (the shutter 113 is closed) in synchronization with the above described change of the optical path state and the focusing lens is returned to the original position (in-focus position in the third optical path state) by the amount of correction of the focusing position of the object image in the focusing correction mode. Then, the shutter 113 is opened for a predetermined time and an image is picked up through the image pickup element 106.

This structure makes it possible to exactly check the focusing state based on the image displayed on the display unit 107 in the second optical path state and then pick up an image focused in the third optical path state.

In step S107, only the front curtain of the shutter 113 is run to create a bulb exposure state and the object light is guided continuously to the image pickup element 116, thereby making it possible for the image pickup to display the image on the display unit 107. In step S108, the power to the display unit 107 is turned on.

In step S109, object images are picked up consecutively using the image pickup element 106, display on the display unit 107 in real time is started, and a series of view finder changeover processes is returned.

In the EVF mode (second optical path state), the object light passed through the image taking optical system 103 may receive a refractive action by the half mirror 111, and therefore the electronic image of the object displayed on the display unit 107 in real time is slightly deviated upward or downward compared to the image actually picked up in the third optical path state.

Figure 12:
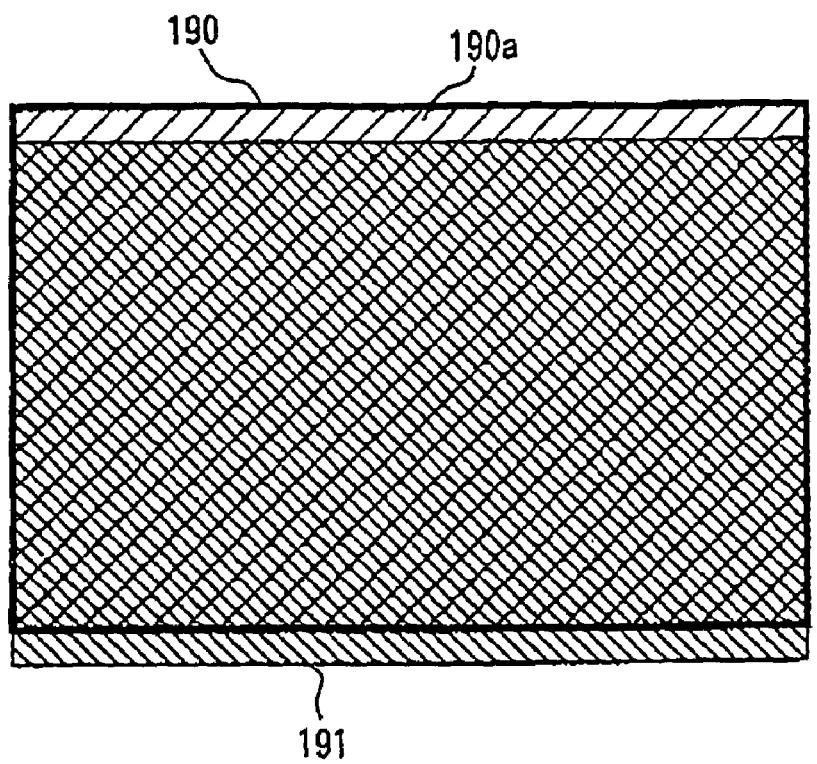
FIG. 12 illustrates a relationship between a field of view that can be output to an electronic image display in real time and a field of view of the picked up image.

FIG. 12 illustrates a difference between the image displayed on the display unit 107 in the second optical path state and the image actually taken in the third optical path state.

In FIG. 12, reference numeral 190 denotes an image pickup range in which an image is picked up in the second optical path state (area enclosed by a bold frame), that is, the range of the image taken which can be output to the display unit 107 in a real-time display. Reference numeral 191 denotes an image pickup range in which an image is picked up in the third optical path state.

The image pickup range 190 and the image pickup range 191 are shifted upward or downward from each other, and as a result, there is an area 190a which can be output to the display unit 107 but is not picked up in the third optical path state, that is, the area of the image pickup range 190 which does not overlap with the image pickup range 191.

Figure 13:
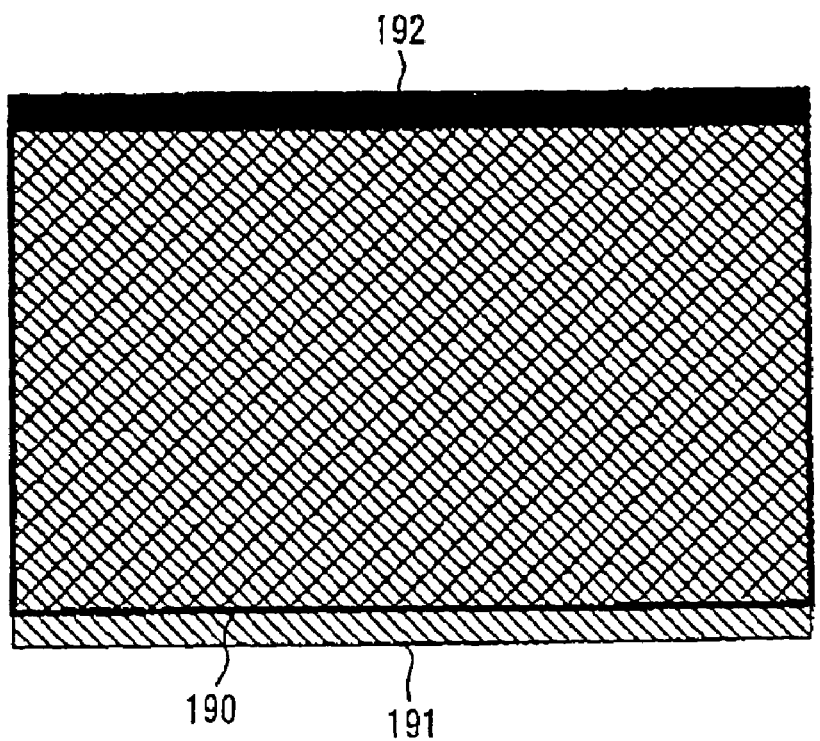
FIG. 13 illustrates a relationship between a field of view that can be output to the electronic image display in real time and a field of view of the picked up image.

Thus, as shown in FIG. 13, the reproduction processing circuit 134 hides the area 192 which corresponds to the area 190a in FIG. 12 and performs processing so that the entire image-taking range 190 is not displayed on the display unit 107. This causes the image pickup area 190 excluding the area 192 (corresponds to the partial area in the claim) to be displayed on the display unit 107. This makes it possible to eliminate the problem that even if the image is displayed on the display unit 107 in the EVF mode, the image is actually not taken.

Then, a case where the process advances on to step S111 to change its mode from the EVF mode to OVF mode based on a decision of the view finder mode in step S100 will be explained.

In the initial state EVF mode, the optical path splitting system including the half mirror 111 and the sub-mirror 122 is in the second optical path state (FIG. 1) and a real-time display is performed on the display unit 107 as described above.

In step S111, the power to the display unit 107 is turned off and image pickup using the image pickup element 106 is stopped. In step S112, the rear curtain of the shutter 113 is run to close the aperture of the shutter 113 and the front curtain/rear curtain driving mechanism is charged in preparation for image-taking.

In step S113, to allow the movement of the half mirror 111, the mirror stoppers 160 and 161 are withdrawn from the moving track of the half mirror 111.

In step S114, the half mirror driving lever 170 is rotated clockwise in FIG. 1, and thereby moving the half mirror 111 and the sub-mirror 122, which make up the optical path splitting system, from the state in FIG. 2→state in FIG. 3→state in FIG. 4→state in FIG. 5 (third optical path state).

When the half mirror driving lever 170 rotates clockwise, the pin 174 is pushed by the second cam face 170c and moved and the pin 173 is pushed by the first cam face 170b and moved. Thus, the half mirror support arm 171 rotates around the rotation shaft 171a clockwise and the half mirror 111 rotates around the pin 173 clockwise (See FIG. 1 to FIG. 5).

In step S115, the mirror stoppers 160 and 161 are inserted in the range of the moving track of the half mirror 111.

After the half mirror 111 is moved to the third optical path state, the mirror stoppers 160 and 161 are inserted, and therefore the inserted mirror stoppers 160 and 161 do not collide with the half mirror 111. This makes it possible to improve structural reliability of the camera of this embodiment when the position of the half mirror 111 is changed (switching between OVF mode and EVF mode).

According to Embodiment 1, the half mirror 111 is moved to the third optical path state, but as far as the mirror stoppers 160 and 161 do not collide with the half mirror 111, the half mirror 111 may also be moved to the vicinity of the position of the third optical path state.

In step S116, the half mirror 111 is changed from the third optical path state (FIG. 5) to the state in FIG. 4 and finally the first optical path state (FIG. 3) by turning the half mirror driving lever 170 counterclockwise in FIG. 5. At this time, the half mirror 111 receives the spring force of the spring (not shown) in the mirror driving mechanism and remains in contact with the mirror stoppers 160 and 161.

In step S117, the eye piece shutter 163 is opened.

In step S118, the camera system control circuit 135 decides based on the output from the operation detection circuit 136 whether a manual (M) focus mode is set or not, and if the manual focus mode is set, the process advances on to step S107 and if an auto focus mode is set instead of the manual focus mode, the process advances on to step 120.

In the case of the manual focus mode, the focus detection unit 121 need not be operated, the degree of blurring of the background can be recognized more accurately with the electronic image display than the optical view finder, and therefore the process advances on to step S107 and a real-time display is performed on the display unit 107.

In step S120, the sub-mirror 122 is set to a predetermined position so that the object light is guided to the focus detection unit 121. That is, the sub-mirror 122 housed in the lower part of the mirror box (FIG. 5) is moved behind the half mirror 111 by turning the sub-mirror 122 around the rotation shaft 125 (FIG. 3).

In step S121, predetermined information is lit and displayed in the view finder under the driving control of the optical view finder internal information display unit 180 and a series of view finder changeover processing is terminated.

Then, the constitution of the focus detection unit 121 and signal processing for focus detection will be explained.

In FIG. 1 to FIG. 5, reference numeral 164 denotes a condenser lens, reference numeral 165 denotes a reflecting mirror, reference numeral 166 denotes re-image formation lens and reference numeral 167 denotes a focus detection sensor.

The light flux passed through the image taking optical system 103, and reflected by the half mirror 111 (in the second optical path state) or by the sub-mirror 122 (in the first optical path state) enters the condenser lens 164 provided in the lower part of the mirror box, and is deflected by the reflecting mirror 165 and a secondary image of the object is formed on the focus detection sensor 167 by the action of the re-image formation lens 166.

The focus detection sensor 167 is provided with at least two pixel arrays and a relatively lateral shift is observed according to the image formation state of the object image formed by the image taking optical system 103 in the focus detection area between the output signal waveforms of the two pixel arrays. The output signal waveforms in the front focus and the rear focus shift to the opposite directions, and it is the principle of focus detection (contrast detection system) that the phase difference (amount of shift) is detected including the shift direction using a technique such as correlation calculation, etc.

Figure 10:
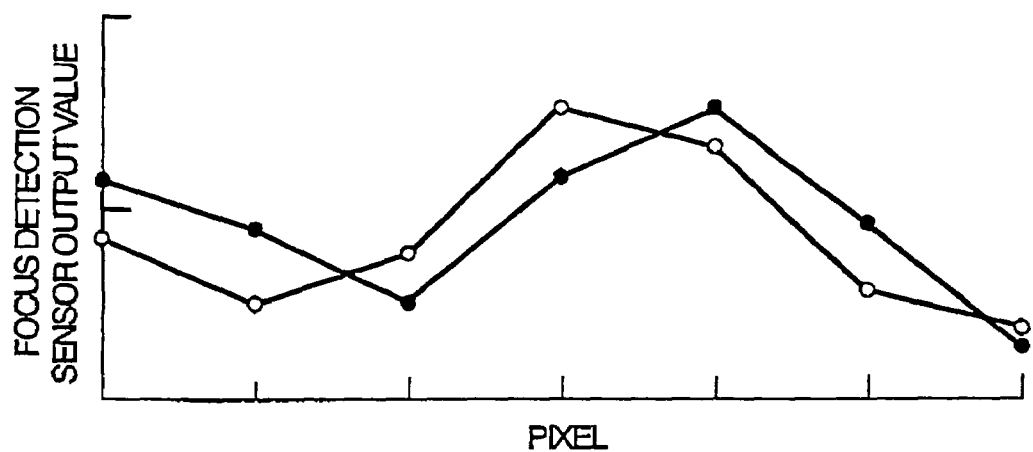
FIG. 10 illustrates waveforms of output signals of a focus detection sensor.
Figure 11:
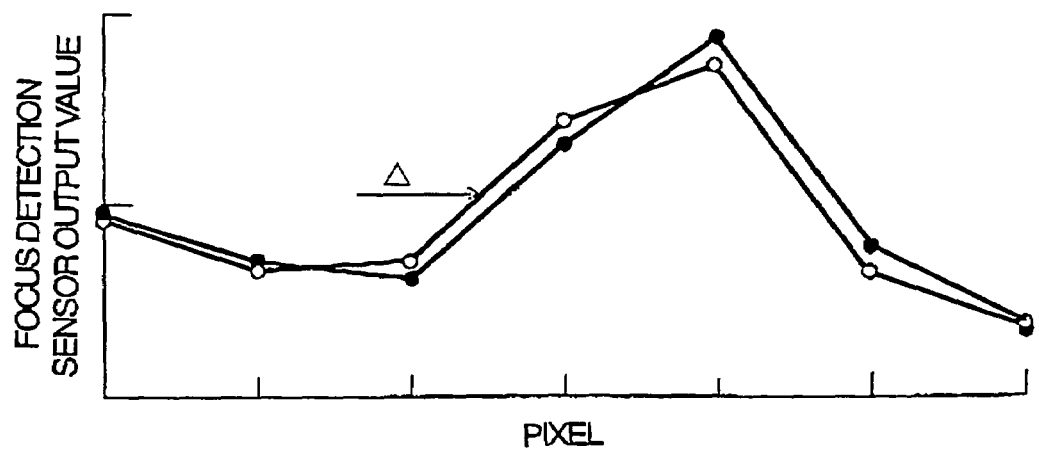
FIG. 11 illustrates waveforms of the output signals of the focus detection sensor.

FIG. 10 and FIG. 11 show output signal waveforms of the focus detection sensor 167 input to the AF control circuit 140. The horizontal axis shows an arrangement of pixels and the vertical axis shows an output value of the focus detection sensor 167. FIG. 10 shows output signal waveforms when focusing on the object image is not achieved and FIG. 11 shows output signal waveforms when focusing on the object image is achieved.

Light beams for focus detection are generally not the same as the image formation beams when the stop is released and focus detection is performed using part of the image formation beams. That is, light beams of a dark F number are used for focus detection. Furthermore, considering errors in the mechanism, the position of the image pickup element 106 cannot be optically conjugate with the position of the focus detection sensor 167 in the strict sense. As a result, even if focusing on the object image is achieved, a small initial phase difference Δ between two output signal waveforms remains (FIG. 11).

This is different from the correction in the above described focusing correction mode to make the electronic displayed image sharp (step S106 in FIG. 9). A true phase difference can be obtained by subtracting the initial phase difference from the phase difference detected by the calculation of correlation between two images, and therefore the existence of the initial phase difference Δ itself normally causes no problem.

However, there is a problem that the position of the reflecting surface of the sub-mirror 122 in the first optical path state does not completely match the position of the reflecting surface of the half mirror 111 in the second optical path state in terms of the accuracy of the mechanism and the initial phase difference Δ also differs slightly. With normal parts machining accuracy, the position of the reflecting surface may deviate in the direction of the normal of the reflecting surface by approximately 30 μm and reducing this amount increases the machining cost of parts considerably.

Thus, an initial phase difference Δ is set in advance for each of the first optical path state and second optical path state and the value of the initial phase difference Δ is changed according to the optical path state. For example, the initial phase differences Δ in the first optical path state and the second optical path state are stored in a memory 135a provided in the camera system control circuit 135. Then, by detecting the position of the mirror (half mirror 111 and sub-mirror 122) or detecting the view finder mode (EVF mode and OVF mode), it is possible to read the initial phase differences Δ in the first optical path state and the second optical path state from the memory 135a.

Adopting such a structure allows focus detection to be performed with a high degree of accuracy in any optical path state.

Thus, using the concept of an initial phase difference, it is possible to detect an in-focus state by deciding the identity of a set of signals. Furthermore, by detecting a phase difference using a publicly known technique using a correlation calculation, for example, the technique disclosed in the above described Document 5, it is possible to calculate a defocus amount. If the defocus amount obtained is converted to the amount of driving the focusing lens of the image taking optical system 103, auto focusing is possible.

The above described method allows the amount of driving the focusing lens to be recognized beforehand, driving of the focusing lens to the in-focus position is required almost one time, and extremely high-speed focusing is possible.

According to the camera system of this embodiment, even when an electronic image display of an object image is performed on the display unit 107 in the second optical path state, it is possible to detect a focusing state according to a phase difference detection system by the focus detection unit 107 as in the case of the first optical path state and perform a high-speed focusing operation (driving of the focusing lens). Furthermore, by allowing continuous image-taking or moving image-taking in the second optical path state, it is possible to realize a high-speed focusing operation. Furthermore, it is possible to reduce the size of the camera system compared to the case in above described Document 4 where the focus detection unit is provided for both the lens apparatus and camera body and prevent the cost from increasing as well.

In this embodiment, the light passed through the image taking optical system 103 in the second optical path state (FIG. 1) is guided by the half mirror 111 to the focus detection unit 121 and the focus detection unit 121 only detects focusing state according to the phase difference detection system, but in addition to this, it is also possible to detect focusing state according to a contrast detection system using the light which has passed through the half mirror 111 and is received by the image pickup element 106.

For example, it is possible to move the focusing lens by focusing according to the phase difference detection system to the vicinity of the in-focus position and stop the focusing lens at the in-focus position by focusing according to the contrast detection system. This makes it possible to move the focusing lens to the vicinity of the in-focus position speedily and improve the accuracy of the in-focus position.

Furthermore, this embodiment has described the camera system having of the lens apparatus 102 and camera body 101, but the present invention is also applicable to a camera constructed of a lens apparatus and camera body combined in one unit. In this case, the lens system control circuit 141 in FIG. 7 is not necessary and the camera system control circuit 135 performs a control operation of the lens system control circuit 141.

As described above, a plurality of lens apparatuses 102 having different focal lengths are attachable/detachable to/from the camera body 101. Therefore, a different signal is transmitted from the camera system control circuit 135 depending on whether the lens apparatus 102 is attachable to the camera body 101 of this embodiment or the conventional camera body.

That is, in the case where the lens apparatus 102 is attachable to the camera body 101 which is explained in this embodiment, a communication exchanged between the camera system control circuit 135 and the lens system control circuit 141 is performed to perform a control described below.

The lens system control circuit 141, which has received a signal indicating the second optical path state (a second mode) from the camera system control circuit 135, controls the aperture of the stop 143.

Exposure is adjusted to display the image on the display unit (image display unit) 107 in the case where the camera body 101 of this embodiment is used. On the other hand, the stop is stopped down to perform a photometry operation and an image-taking operation in the case where the conventional camera body is used.

An auto focus operation, in the case where the conventional camera body is used and an auto focus operation in the case where the lens system control circuit 141 receives a signal indicating the first optical path state (a first mode) from the camera system control circuit 135 in the camera system of this embodiment, is performed with a full opened aperture.

On the contrary, in the camera system of this embodiment, a focus operation of the image-taking optical system 103 according to the detection result of the focus detection unit 121 is allowed even if the stop 143 is stopped down in the second optical path state.

Furthermore, in the camera system of this embodiment, after the aperture of the stop is changed and the image-taking operation (continuous image-taking or moving image-taking) is performed, the aperture of the stop 143 is returned to a state for displaying the image on the display unit 107.

According to this embodiment, when the light flux from the image taking optical system 103 is guided to the view finder optical system (first optical path state) and the image pickup element (second optical path state), the light flux is also guided to the focus detection unit 121. This makes it possible to detect the focusing state according to a phase difference detection system by the focus detection unit 121 not only when an object image is observed through the view finder optical system but also when the object image is picked up by the image pickup element (e.g., when continuous image-taking or moving image-taking is performed).

For this reason, when an object image is picked up using the image pickup element 106, it is possible to perform a focusing operation more quickly than a (conventional) case where a focusing state is detected according to a contrast detection system. Moreover, there is no need to provide two focus detection units as described in above Document 4, and therefore it is possible to prevent any increase in size and cost of the apparatus.

Furthermore, even when an image picked up using the image pickup element 106 is displayed on the display unit 107 and this image is observed, it is possible to perform the focusing operation quickly as described above.

Embodiment 2

A camera system which is Embodiment 2 of the present invention will be explained.

According to Embodiment 1, the first optical path state is directly changed to the second optical path state and when the second optical path state is changed to the first optical path state, this is done through the third optical path state.

On the other hand, according to this embodiment, when a changeover is made between the first optical path state and the second optical path state, this is done through the third optical path state and this is a point in which Embodiment 2 differs from Embodiment 1. The parts different from those of Embodiment 1 will be explained below.

The rest of the camera structure other than the optical path splitting system (half mirror, sub-mirror and mirror driving mechanism) is generally the same as the camera structure of Embodiment 1, and therefore the same members as those explained in Embodiment 1 are assigned the same reference numerals.

Figure 14:
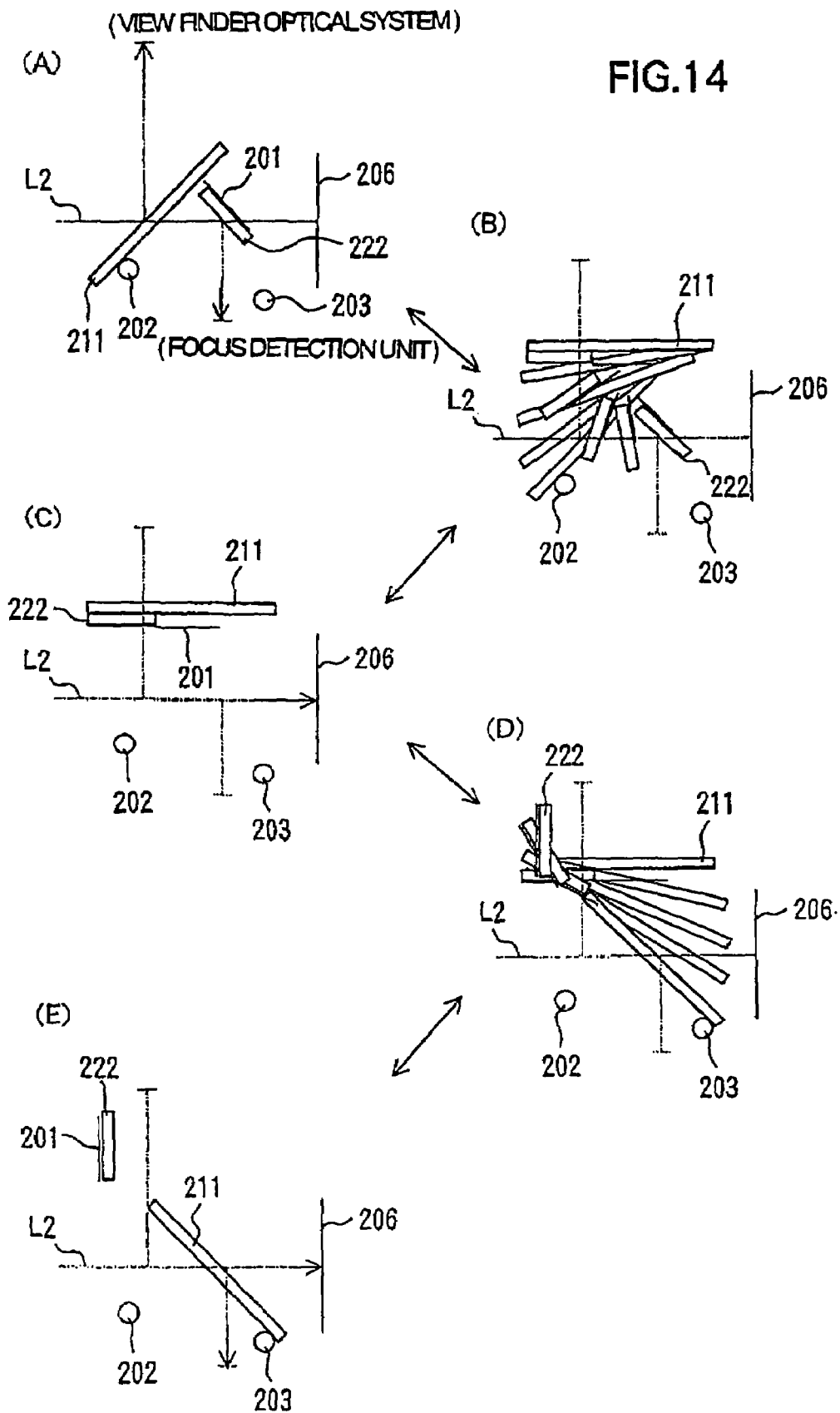
FIG. 14 illustrates operations of an optical path splitting system according to Embodiment 2 (A to E).

FIG. 14 illustrates operations of an optical path splitting system according to this embodiment. FIG. 14(A) illustrates the first optical path state, FIG. 14(C) illustrates the third optical path state and FIG. 14(E) illustrates the second optical path state. Furthermore, FIG. 14(B) illustrates the process of transition between the first optical path state and the third optical path state with its sequential steps shown simultaneously and FIG. 14(D) illustrates the process of transition between the third optical path state and the second optical path state with its sequential steps shown simultaneously.

In these figures, reference numeral L2 denotes an optical axis of the image taking optical system 103, reference numeral 206 denotes an image pickup element (light receiving surface), reference numeral 211 denotes a movable-type half mirror, reference numeral 222 denotes a sub-mirror and reference numeral 201 denotes a light-blocking plate. Reference numeral 202 denotes a mirror stopper which contacts the half mirror 211 to hold the half mirror 211 in a first optical path state. Reference numeral 203 denotes a mirror stopper which contacts the half mirror 211 to hold the half mirror 211 in a second optical path state. These mirror stoppers 202 and 203 are fixed inside the camera body unlike Embodiment 1.

In the first optical path state shown in FIG. 14(A), the half mirror 211 is placed on the diagonal with respect to the optical axis L2 and positioned by receiving a spring force of a spring (not shown) and contacting the mirror stopper 202. Furthermore, a sub-mirror 222 is located behind the half mirror 211.

The first optical path state is a state in which the OVF mode is set as in the case of Embodiment 1 and it is possible to observe an object image through a view finder optical system and detect a focusing state according to a phase difference detection system by a focus detection unit 121.

A light flux incident on the half mirror 211 from the image taking optical system 103 located on the left in the figure along the optical axis L2 is partially reflected in the upward direction of the camera (upward in the figure) on the surface of the half mirror 211 and guided to the view finder optical system. On the other hand, the rest of the light flux passes through the half mirror 211, reflected in the downward direction of the camera (downward in the figure) by the sub-mirror 222 located behind the half mirror 211 and guided to the focus detection unit 121.

In the third optical path state shown in FIG. 14(C), the half mirror 211 and sub-mirror 222 are withdrawn to positions in the upper part of the camera so as not to interrupt the image formation light flux. At this time, the light-blocking plate 201 covers the area of the half mirror 211 which does not overlap with the sub-mirror 222 and blocks reverse incident light from the view finder optical system together with the sub-mirror 222. This prevents the reverse incident light from the view finder optical system from entering the image pickup element 206 and can thereby prevent any ghost image from occurring.

In the second optical path state shown in FIG. 14(E), the half mirror 211 is placed on the diagonal with respect to the optical axis L2 and is positioned by receiving a spring force of a spring (not shown) and contacting the mirror stopper 203. On the other hand, the sub-mirror 222 is placed in the upper part of the camera together with the light-blocking plate 201 and withdrawn from the image-taking optical path.

The second optical path state is a state in which the EVF mode is set as in the case of Embodiment 1, and it is possible to observe an object image through the display unit 107 and the focus detection unit 121 can detect the focusing state according to a phase difference detection system.

The light flux incident on the half mirror 211 from the image taking optical system 103 located on the left side in the figure along the optical axis L2 is partially reflected on the back surface of the half mirror 211 in the downward direction of the camera and guided to the focus detection unit 121. Furthermore, the rest of the light flux passes through the half mirror 211 and enters the image pickup element 206.

The transition from the first optical path state (A) to the third optical path state (C) is substantially the same as a mirror raising operation of a general single-lens reflex camera as shown in FIG. 14(B). That is, the half mirror 211 rotates in such a way that its surfaces turns up in the camera and the sub-mirror 222 rotates in such a way that its reflecting surface turns up in the camera. At this time, the sub-mirror 222 moves to the position along the half mirror 211.

The transition from the third optical path state (C) to the first optical path state (A) is an operation opposite to the above described operation (from (A) to (C) in FIG. 14). Furthermore, the above described operations of the half mirror 211 and sub-mirror 222 can be performed by, for example, transmitting the driving force of the motor to a cam member through a gear train, rotating the cam member and thereby moving pins of the half mirror 211 and sub-mirror which engages with the cam member.

On the other hand, in the transition from the third optical path state (C) to the second optical path state (E), the half mirror 211 located substantially parallel to the optical axis L2 starts to lower from the back end of the half mirror 211, that is, the side close to the image pickup element 206 and contacts the mirror stopper 203. At this time, the back surface of the half mirror 211 faces the image taking optical system 103 side.

The position of the half mirror 211 substantially matches the position of the sub-mirror 222 in the first optical path state. Here, in this embodiment, unlike Embodiment 1, the reflecting surface of the half mirror 211 faces the image pickup element 206 side, and therefore the position of the half mirror 211 is determined in such a way that the optical axis after deflection by the half mirror 211 matches the optical axis of the light incident on the focus detection unit 121 in the first optical path state.

Such a structure makes it possible to prevent the position of the focus detection area from varying between the first optical path state and the second optical path state.

According to this embodiment, when the first optical path state and the second optical path state are switched, this is done through the states in FIG. 14(B) to 14(D), and therefore there is no need to make the mirror stoppers 202 and 203 movable (structure of moving the mirror stoppers forward or backward with respect to the moving track of the mirror) as in the case of Embodiment 1. Furthermore, the operations of the half mirror 211 and sub-mirror 222 are not interrupted by the mirror stoppers 202 and 203, and therefore it is possible to secure structural reliability when switching between the first optical path state and the second optical path state.

According to the camera system of this embodiment, even when an electronic image of an object is displayed on the display unit 107 in the second optical path state, it is possible to detect a focusing state according to a phase difference detection system as in the case of the first optical path state, and therefore it is possible to realize a high-speed focusing operation (driving of focusing lens). Furthermore, by performing continuous image-taking and moving image-taking in the second optical path state, it is possible to perform a high-speed focusing operation. Moreover, since there is no need to provide a focus detection unit in the lens apparatus and camera body as in the case of above described Document 4, it is possible to reduce the size of the camera and prevent its cost from increasing.

Embodiment 1 and Embodiment 2 have described the camera for taking color pictures as an example, but the present invention is not limited to the above described embodiments and it is also applicable to an infrared image taking apparatus, monochrome camera or binocular with an image pickup function, etc.

While preferred embodiments have been described, it is to be understood that modification and variation of the present invention may be made without departing from scope of the following claims.

What is claimed is:

1. An image taking apparatus comprising:
   a light splitting unit which splits a light flux from an image-taking lens into a plurality of light fluxes;
   a view finder optical system configured and positioned to observe an object image formed by the light flux from the image-taking lens;
   an image pickup element which photoelectrically converts the object image to an electrical signal; and
   a focus detection unit configured and positioned to detect the focusing state of the image-taking lens according to a phase difference detection system,
   wherein the light splitting unit changes its state among a first state in which the light flux is directed to the view finder optical system and the focus detection unit, a second state in which the light flux is directed to the image pickup element and the focus detection unit and a third state in which the light flux is directed only to the image pickup element,
   wherein the light splitting unit has a half mirror and a reflection mirror which prevents an incident light flux from passing through the reflection mirror
   wherein in the first state, the half mirror and the reflection mirror are positioned in an image-taking optical path so that part of the light flux is reflected by the half mirror and directed to the view finder optical system, and the rest of the light flux a) passes through the half mirror, b) is reflected by the reflection mirror, and c) is directed to the focus detection unit, and
   wherein in the second state, the reflection mirror is withdrawn from the image-taking optical path and the orientation of the reflecting surface of the half mirror is changed in the image-taking optical path with respect to the first state so that part of the light flux is reflected by the half mirror and directed to the focus detection unit, and the rest of the light flux passes through the half mirror and is directed to the image pickup element, and
   wherein in the third state, the half mirror and the reflection mirror are withdrawn from the image-taking optical path so that the light flux is directed only to the image pickup element.

2. The image taking apparatus according to claim 1, further comprising:
   an image display unit which displays image data acquired using the image pickup element; and
   a control circuit which controls the driving of the image display unit,
   wherein the control circuit causes the image display unit to display the image data when the light splitting unit is in the second state.

3. The image taking apparatus according to claim 2,
wherein the control circuit causes the image display unit to display only a part of the image data when the light splitting unit is in the second state.

4. The image taking apparatus according to claim 1, further comprising:
an information display unit which displays information within the field of view of the view finder optical system; and
a control circuit which controls the driving of the information display unit,
wherein the control circuit does not drive the information display unit when the light splitting unit is in the second state.

5. The image taking apparatus according to claim 1, further comprising:
a light-blocking member which moves with respect to the optical path of the view finder optical system; and
a control circuit which controls the driving of the light-blocking member,
wherein the control circuit causes the light-blocking member to be inserted into the optical path of the view finder optical system when the light splitting unit is in the second state.

6. The image taking apparatus according to claim 1, further comprising:
a control circuit which determines the focusing state of the image-taking lens based on the output of the focus detection unit,
wherein the control circuit changes the determination of the focusing state according to the first state and the second state.

7. The image taking apparatus according to claim 6,
wherein the control circuit determines the focusing state by correcting the output of the focus detection unit based on an initial phase difference and changes the value of the initial phase difference according to the first state and the second state.

8. The image taking apparatus according to claim 1,
wherein the position of the reflecting surface of the reflection mirror in the first state is substantially the same as the position of the reflecting surface of the half mirror in the second state.

9. The image taking apparatus according to claim 1,
wherein when changing from one state to the other between the first state and the second state, the light splitting unit is placed in the third state.

10. The image taking apparatus according to claim 1, further comprising:
a stopper member which contacts the half mirror for positioning the half mirror in the first state,
wherein the stopper member can move with respect to a moving track of the half mirror.

11. The image taking apparatus according to claim 1,
wherein the image-taking lens is attachable and detachable to the image taking apparatus.

* * * * *

UNITED STATES PATENT AND TRADEMARK OFFICE
CERTIFICATE OF CORRECTION

PATENT NO. : 7,414,664 B2 Page 1 of 1
APPLICATION NO. : 10/770437
DATED : August 19, 2008
INVENTOR(S) : Yasuo Suda It is certified that error appears in the above-identified patent and that said Letters Patent is hereby corrected as shown below:

COLUMN 3
Line 54, "comprising;" should read --comprising:--.

COLUMN 5
Line 56, "111a" should read --111 a--.

COLUMN 22
Line 38, "mirror" should read --mirror,--.

Signed and Sealed this

Third Day of February, 2009

JOHN DOLL
*Acting Director of the United States Patent and Trademark Office*